(12) United States Patent
Siegel

(10) Patent No.: US 9,034,409 B2
(45) Date of Patent: May 19, 2015

(54) FLAVORING SUBSTANCE-INCLUDED CELLULOSE

(75) Inventor: Sven Siegel, Höxter (DE)

(73) Assignee: SYMRISE AG, Holzminden (DE)

( * ) Notice: Subject to any disclaimer, the term of this patent is extended or adjusted under 35 U.S.C. 154(b) by 715 days.

(21) Appl. No.: 12/624,107

(22) Filed: Nov. 23, 2009

(65) Prior Publication Data

US 2010/0129516 A1    May 27, 2010

(30) Foreign Application Priority Data

Nov. 27, 2008 (DE) .......................... 10 2008 044 126

(51) Int. Cl.
| | |
|---|---|
| A23L 1/22 | (2006.01) |
| A21D 2/18 | (2006.01) |
| A23G 3/36 | (2006.01) |
| A23G 4/06 | (2006.01) |
| A23L 1/0534 | (2006.01) |
| A23L 1/164 | (2006.01) |
| A23L 1/217 | (2006.01) |
| A23L 1/221 | (2006.01) |
| A23L 1/24 | (2006.01) |
| A23L 1/314 | (2006.01) |
| A23L 1/39 | (2006.01) |
| A23L 1/40 | (2006.01) |
| C08L 1/02 | (2006.01) |

(52) U.S. Cl.
CPC ............. *A23L 1/22008* (2013.01); *A21D 2/188* (2013.01); *A23G 3/36* (2013.01); *A23G 4/06* (2013.01); *A23L 1/0534* (2013.01); *A23L 1/1643* (2013.01); *A23L 1/1645* (2013.01); *A23L 1/217* (2013.01); *A23L 1/221* (2013.01); *A23L 1/243* (2013.01); *A23L 1/31445* (2013.01); *A23L 1/39* (2013.01); *A23L 1/40* (2013.01); *A23V 2002/00* (2013.01); *C08L 1/02* (2013.01)

(58) Field of Classification Search
CPC ............. A23L 1/22; A23L 1/03; A23L 1/221; A23L 1/226; A23L 1/22008
USPC ........................................................ 426/536
See application file for complete search history.

(56) References Cited

U.S. PATENT DOCUMENTS

| | | | | |
|---|---|---|---|---|
| 3,656,991 | A | * | 4/1972 | Blackwell et al. ............. 427/158 |
| 4,016,029 | A | * | 4/1977 | Samuelson ...................... 162/31 |
| 4,341,807 | A | | 7/1982 | Turbak et al. |
| 4,471,871 | A | | 9/1984 | Rockliffe et al. |
| 4,536,217 | A | * | 8/1985 | Loth et al. ...................... 106/122 |
| 5,057,334 | A | * | 10/1991 | Vail ................................ 426/634 |
| 5,700,397 | A | | 12/1997 | Maeda et al. |
| 2002/0076556 | A1 | * | 6/2002 | Luo et al. ....................... 428/393 |
| 2002/0188019 | A1 | | 12/2002 | Ley et al. |
| 2004/0137138 | A1 | | 7/2004 | Kawamura et al. |
| 2004/0180067 | A1 | * | 9/2004 | Popplewell et al. .......... 424/401 |
| 2005/0175756 | A1 | * | 8/2005 | Fukasawa ...................... 426/549 |
| 2005/0272836 | A1 | * | 12/2005 | Yaginuma et al. .............. 524/27 |
| 2006/0267243 | A1 | * | 11/2006 | Tindall ..................... 264/211.11 |

FOREIGN PATENT DOCUMENTS

| | | |
|---|---|---|
| DE | 10 2004 041 496 A1 | 3/2006 |
| GB | 2079578 A | 1/1982 |
| WO | WO-2005/096841 A1 | 10/2005 |
| WO | WO-2006/003107 A1 | 1/2006 |
| WO | WO-2006/058893 A2 | 6/2006 |
| WO | WO-2006/062089 A1 | 6/2006 |
| WO | WO-2006/106023 A1 | 10/2006 |
| WO | WO-2007/003527 A1 | 1/2007 |
| WO | WO-2007/045566 A1 | 4/2007 |

OTHER PUBLICATIONS

Extended European Search Report, European Application No. 09176691.5, dated Mar. 19, 2010.
European Office Action, European Application No. 09 176 691.5, received on Jan. 15, 2015.

* cited by examiner

*Primary Examiner* — Michele L Jacobson
*Assistant Examiner* — Jeffrey Mornhinweg
(74) *Attorney, Agent, or Firm* — Novak Druce Connolly Bove + Quigg LLP

(57) ABSTRACT

The present invention concerns a flavoring substance-included cellulose, comprising or consisting of cellulose and flavoring substances included in the cellulose, methods for producing such flavoring substance-included celluloses, and mixtures comprising flavoring substance according to the invention.

20 Claims, No Drawings

FLAVORING SUBSTANCE-INCLUDED CELLULOSE

CROSS-REFERENCE TO RELATED APPLICATION

This application claims benefit of priority to DE 10 2008 044 126.0, filed on Nov. 27, 2008, which is incorporated herein by reference in its entirety.

The present invention concerns flavoring substance-included celluloses comprising or consisting of cellulose and certain included flavoring substances. These flavoring substance-included celluloses may be present in the form of mixtures with accompanying substances and possibly water.

The present invention also concerns a method for producing flavoring substance-included celluloses, the use of flavoring substance-included celluloses according to the invention as a means of flavoring preparations or semi-finished products for nourishment or pleasure and corresponding preparations and semi-finished products for nourishment or pleasure.

Flavoring substances are predominantly volatile compounds which during storage or also processing in the food industry demonstrate high loss rates, for example due to volatilization, evaporation, vaporescence, steam distillation and oxidation. Because of these stated and other negative circumstances flavoring substances in the most varied of application areas frequently demonstrate insufficient stability, so that for example the flavor intensity perceived at the time of consumption is lessened, the flavoring profile changed and undesired wrong taste notes possibly formed.

In order to stabilize flavoring substances in the known state of the art additives are mainly used, such as for example antioxidants, or/and the flavoring substances are protected by encapsulation. The use of additives should only take place, however, where their application is absolutely essential, and even then the quantity used should be kept as low as possible. Antioxidants in themselves do not as a rule contribute to reducing the volatility of flavoring substances either.

In order to reduce volatilization of flavoring substances encapsulation products are often used. The normal excipients used for this mostly have one or more frequently even more disadvantages, however. Thus, for example, native starches, maltodextrins and sugar can be cariogenic. Sugar alcohols used as a substitute for these substances remove the problem cariogenity, but in large quantities can often have a laxative effect. Yeast cells can be used to increase flavor retention during cooking, baking and deep-frying, but often have a pronounced taste of their own, which may be undesirable in some applications. When animal protein is used numerous religious and ethnic issues and special dietary practices (e.g. vegetarianism) have to be taken into account, so that encapsulated products containing animal protein will often be rejected by certain consumers. The replacement of animal protein by vegetable protein is not always possible because of the to some extent highly different characteristics. In the past other raw materials have sometimes been in scarce supply. One such product is gum Arabic, the main producing country of which is Sudan which was affected by civil war for many years.

Where a combination of, for example, oxidation protection and volatilization protection of flavoring substances is required, for many excipients (used in encapsulation) a disadvantageous encapsulation in combination with the use of antioxidants is necessary. Thus, for example, it is advisable to provide orange oil encapsulated in yeast cells with additional protection by antioxidants in order to achieve a longer shelf life. In principle oxidation stability in combination with very good volatilization protection can also be achieved by the sole use of cyclodextrins, but under the legislation in Europe the use of beta-cyclodextrin for encapsulation of flavoring substances is only permitted to a certain extent and for other cyclodextrins hardly at all.

Many excipients used in encapsulations can also be used by the body for energy. In highly-developed industrialized countries the excessive consumption of energy from food has proven to be problematical and is increasingly leading to obesity and to the associated concomitant diseases such as diabetes, cardio-circulatory disorders and muscular-skeletal and locomotor system complaints. Many excipients, in particular starch, maltodextrins, glucose and sucrose, after being broken down by enzymes are metabolized in the body in an insulin-dependent manner. However, a high and ever-increasing proportion of the population, in particular in the highly-developed industrialized countries, suffers from the metabolic disorder of diabetes, for which reason the introduction of insulin-dependent metabolizing substances should be controlled as far as possible.

The first problem for the present invention was therefore to provide a product with flavoring substances, in particular an encapsulation product with flavoring substances, in which the flavoring substances demonstrate an increased stability and wherein the product or the encapsulation product preferably does not have some or all of the above-mentioned disadvantages.

Also a problem for the present invention was to indicate a method for producing such products or encapsulation products.

Further problems for the present invention are illustrated by the following explanations and the attached claims.

The primary problem is solved according to the invention by a flavoring substance-included cellulose, comprising or consisting of
(i) cellulose and
(ii) one, two, three, four or more flavoring substances included in the cellulose, providing that the included flavoring substances are not alkanoic acids with between 1 and 4 C-atoms.

More detailed explanations and preferred embodiments of a flavoring substance-included cellulose according to the invention are given in the following.

Such a flavoring substance-included cellulose is not known from the state of the art.

Low fatty-acid-included celluloses (acetic acid, propionic acid, butyric acid) have long been used in the textile industry as an option for cellulose activation. The formation of the inclusion complexes reduces the crystallinity and increases the specific surface area of the cellulose. This modification makes cellulose more accessible to cross-linking and other special finishing agents. For example, by the formation of inclusion complexes with the stated fatty acids the reaction time of the cellulose acetylation can be accelerated. After aqueous pre-swelling of the cellulose the water is replaced by the low fatty acids. Then the acetylation reaction is performed (Staudinger H.; Eicher, T.: Über die Quellung resp. Inclusion der Cellulose mit niederen Fettsäuren, (On the swelling or inclusion of cellulose with low fatty acids) Makromol. Chem. 10, 254-260 (1953)). A flavoring substance-included cellulose according to the invention is not described there, however.

In J. Prakt. Chem., 161, 219 (1942), Staudinger and Döhle present a series of solvent-included celluloses, for preparing the cellulose for the acetylation reaction. A flavoring substance-included cellulose according to the invention is not described there either.

In Textile Research Journal (1974), 44(12)), 941-5 ("Structure and stability of chloroform-included cotton cellulose"), Wade and Creely describe inclusion complexes of chloroform or tetrachloromethane in cotton cellulose, wherein 20% chloroform or 7% tetrachloromethane can be included. For production purposes cotton is swollen for 30 minutes in liquid ammonia and then immersed in a mixture of liquid ammonia and chloroform or tetrachloromethane. The ammonium is removed. The complexes have a low stability. A flavoring substance-included cellulose according to the present invention is not described there.

Zeronian (Zeronian, S. H.: Crystallinity Determinations on Chloroform-Included Cellulose; Textile Research Journal, January 1964; p. 83 seq.) describes for the inclusion of chloroform a method using the intermediate, indirect swelling substance ethanol. In a first step the cellulose is swollen for 18 hours in water. The water is then successively replaced over a period of 24 hours with seven portions of ethanol. In the final step, over a period of 24 hours by the successive addition of chloroform in seven portions, the inclusion of the chloroform takes place. After drying a complex with a chloroform content of 4.0% is obtained. Inclusion celluloses with flavoring substances are not described, however. In the method enormous quantities of ethanol (280 kg ethanol/kg cellulose) are consumed and the losses of chloroform are more than 99%. As a result the method is not economical.

WO 2006/062089 describes highly dispersible cellulose complexes of a hydrophilic substance, a water-soluble polymer and water-dispersible cellulose. The water-soluble polymer can be selected from gum Arabic, xanthan gum, sodium-carboxymethylcellulose, gellan gum, and indigestible dextrin. The hydrophilic substance is highly soluble in cold water, has low viscosity and is solid at room temperature. Examples of the hydrophilic substances are dextrine, water-soluble sugar and sugar alcohols. The production of the complexes takes place in aqueous dispersion or solution. The complexes described can be mixed with flavors, wherein however, as explained below in the comparative examples and of these in particular example 33, no inclusion celluloses with flavoring substances are formed.

US 2004/137138 describes complexes of cellulose, carob gum, xanthan gum and a hydrophilic material. The hydrophilic material is highly soluble in water and hardly affects the viscosity. The hydrophilic materials are selected from dextrins, water-soluble sugars, sugar alcohols and low viscosity, water-soluble dietary fiber. In the wet crushing the complexes form only in the presence of large quantities of water and during the subsequent drying. The complexes of cellulose, carob gum, xanthan gum and a hydrophilic material are used in foods, wherein flavors can also be added to the foods. In doing so, however, according to our own investigations, neither in wet nor dry foods do flavoring substance-included celluloses result, as shown in the comparative examples 4, 21 and 33 below.

Inclusion celluloses with included flavors or flavoring substances, the production or use of the same, are not described in the state of the art.

A flavoring substance according to the invention (as described above) is a cellulose, in which one, two, three, four or more flavoring substances (with the exception of alkanoic acids with between 1 and 4 C-atoms) are included. In the context of the present invention, it is generally the case that the flavoring substances included, or to be included in the cellulose, are not alkanoic acids with between 1 and 4 C-atoms.

The flavoring substance according to the invention is an inclusion compound in the sense of the following definition:

An inclusion compound consists of so-called host (here: cellulose) and guest (here: flavoring agent(s) substances). The host substances make voids available at the molecular level, in which guest substances are embedded (included). The void can be present in the molecule of the host substance itself (intramolecular inclusion compound) or in combination with the host molecules (e.g. crystal lattice). The nature of the inclusion compounds is such that the guest substances are not present by integration through primary and secondary valency bonds, but mainly though spatial fencing-in in the host substance. One way of distinguishing included flavoring substances from non-included flavoring substances (for example those bonded to the surface) in the context of the present invention is described below.

Cellulose is a linear polysaccharide built from beta-1.4-glycosidic linked residual glucose molecules (anhydroglucopyranose units). Because of the beta-position of the OH-group on the C-1 atom adjacent residual glucose molecules are rotated by 180°. The smallest recurring unit is referred to as a cellobiose. Cellulose is an important component of plant cell walls and is the most common and most important naturally occurring biopolymer. In plant fibers cellulose has a hierarchical structure. Thus within a plant fiber there will be numerous cellulose macrofibrils, which in turn comprise a number of microfibrils. The microfibrils of cellulose for their part comprise a number of elementary fibrils which for their part are in turn comprised various cellulose chains (individual cellulose molecules). With cellulose as the host substance of an inclusion compound inclusion may possibly take place in the host molecule bond, whereby investigations allow it to be believed that the guest substances (here: flavoring substance(s)) are embedded in voids (probably both in amorphous and in crystalline areas), which are positioned between cellulose chains. It is currently believed that this embedding takes place in particular within the elementary fibrils, wherein inclusion between the elementary fibrils, microfibrils and/or macrofibrils can also (additionally) take place. It is necessary to note here that the present considerations are of a provisional nature and cannot be treated as definite and conclusive.

Depending on the kind of plant, cellulose is accompanied by varying proportions of lignin and hemicellulose (polyoses). Lignin and hemicellulose are therefore frequently referred to as accompanying substances of cellulose.

In the context of the present invention the term flavoring substances is used in the sense of Council Directive 88/388/EEC of 22 Jun. 1988, published in OJ L 184 of 15 Jul. 1988, p. 61. A flavoring substance according to this Directive is:

"a defined chemical substance with flavoring properties which is obtained:
(i) by appropriate physical processes (including distillation and solvent extraction) or enzymatic or microbiological processes from material of vegetable or animal origin either in the raw state or after processing for human consumption by traditional food-preparation processes (including drying, torrefaction and fermentation),
(ii) by chemical synthesis or isolated by chemical processes and which is chemically identical to a substance naturally present in material of vegetable or animal origin as described in (i),
(iii) by chemical synthesis but which is not chemically identical to a substance naturally present in material of vegetable or animal origin as described in (i);"

Flavoring substances within the meaning of this definition occur in particular in the following extracts, essential oils, concretes, absolutes, resins, resinoids, balms or tinctures: amyris oil; angelica seed oil; angelica root oil; aniseed oil; valerian oil; basil oil; tree moss absolute; bay (myrcia) oil;

motherwort or mugwort oil; benzoin resin; bergamot oil; beeswax absolute; birch tar oil; bitter almond oil; savory oil; buchu leaf oil; cabreuva oil; cade oil; calmus oil; camphor oil; cananga oil; cardamon seed oil; cascarilla oil; cassia oil; cassia absolute; castoreum absolute; cedar leaf oil; cedar wood oil; cistus oil; citronella oil; lemon oil; copaiba balsam; copaivabalsam oil; coriander oil; costus root oil; cumin oil; cypress oil; davana oil; dill weed oil; dill seed oil; oak moss absolute; elemi oil; tarragon oil; eucalyptus citriodora oil; eucalyptus oil; fennel oil; fir needle oil; galbanum oil; galbanum resin; geranium oil; grapefruit oil; guaiac wood oil; guaiac balsam; guaiac balsam oil; helichrysum absolute; helichrysum oil; ginger oil; iris root absolute; iris root oil; jasmin absolute; calmus oil; chamomile oil bleu; chamomile oil roman; carrot seed oil; cascarilla oil; pine needle oil; mint oil; carvi oil; labdanum oil; labdanum absolute; labdanum resin; lavandin absolute; lavandin oil; lavender absolute; lavender oil; lemongrass oil; lovage oil; lime oil distilled; lime oil pressed; Bursera penicillata (linaloe) oil; litsea-cubeba oil; bay laurel leaf oil; macis oil; marjoram oil; mandarin oil; massoirinde oil; mimosa absolute; ambrette seed oil; ambrette tincture; muskatelle salbei oil; nutmeg oil; myrrh absolute; myrrh oil; myrtle oil; carnation leaf oil; carnation blossom oil; neroli oil; olibanum absolute; olibanum oil; opopanax oil; orange blossom absolute; orange oil; oregano oil; palmarosa oil; patchouli oil; perilla oil; Peru balsam oil; parsley leaf oil; parsley seed oil; clove seed oil; peppermint oil; pepper oil; pimento oil; pine oil; poley oil; rose absolute; rose wood oil; rose oil; rosemary oil; sage oil; lavandin; sage oil Spanish; sandalwood oil; celery seed oil; lavender spike oil; star anis oil; styrax oil; tagetes oil; pine needle oil; tea-tree oil; turpentine oil; thyme oil; tolu balm; tonka absolute; tuberose absolute; vanilla extract; violet leaf absolute; verbena oil; vetiver oil; juniper berry oil; wine yeast oil; wormwood oil; wintergreen oil; ylang ylang oil; hyssop oil; civet absolute; cinnamon leaf oil; cinnamon bark oil.

Examples of flavoring substances to be used according to the invention are listed in sections 1 to 3 of Commission Decision of 23 Feb. 1999 on a register of flavoring substances used or intended for use in or on foodstuffs, drawn up in accordance with Regulation (EC) No. 2232/96 of the European Parliament and of the Council of 28 Oct. 1996 (1999/217/EC), published in Official Journal L 84/1 of 27 Mar. 1999 and as an appendix to the Ruling of the Commission of 18 Jul. 2000 amending Commission Decision 1999/217/EC on a register of flavoring substances used in or on foodstuffs (2000/489/EC), published in the OJ of the European Communities L 197/53 of 3 Aug. 2000.

In connection with the present invention lipophilic flavoring substances are preferably included in the cellulose. Lipophilic flavoring substances cannot be embedded in cellulose simply by immersion, since they do not have the capacity to swell cellulose that has not been pre-swollen, i.e. they can only be embedded (included) in a pre-swollen cellulose. Methods according to the invention for producing such flavoring substance-included celluloses according to the invention will be described further below.

In connection with the present text the term lipophilic flavoring substances means in particular flavoring substances with a $logP_{OW}$ of greater than 1.0.

The $logP_{OW}$ is the decadic logarithm of the distribution coefficient of a substance, here of the respective flavoring substance, concerning its distribution between 1-octanol and water. The coefficient is an expression of the ratio of the proportions of a substance in the two contacted phases of 1-Octanol (apolar) and water (polar) at the equilibrium. The coefficient $P_{OW}$ thus increases as the liposolubility rises. Accordingly compounds with a high $logP_{OW}$ are more lipophilic than those with a low $logP_{OW}$. Where in the context of the present text $logP_{OW}$ values are given, these refer to measurements at a temperature of 25° C.

So according to the present invention a flavoring substance according to the invention is preferred, wherein a or one, several or all of the included flavoring substance(s) has or have a $logP_{OW}$ of higher than 1.0. Further preference is for the or one, several or all of the included flavoring substances to have a $logP_{OW}$ of higher than 1.5, preferably of higher than 2.0, more preferably higher than 3.0 and particularly preferably of higher than 4.0.

Particular preference is for a flavoring substance according to the invention (as described above), wherein the total proportion of included flavoring substances with a $logP_{OW}$ of higher than 1.0 with reference to the total quantity of included flavoring substances is preferably at least 10%, preferably at least 30% and particularly preferably at least 50%.

The flavoring substance-included celluloses according to the invention described above (and in particular the preferred embodiments of these described further below) have numerous advantages. Thus the included flavoring substances contained have particular protection from volatilization, oxidation and flavoring substance-flavoring substance reactions. The inclusion of the flavoring substances advantageously allows in particular protection from negative influences such as volatilization, evaporation, vaporescence, steam distillation, UV radiation, heat load, pressure and oxidation. Other advantages of the flavoring substance-included celluloses according to the invention are that cellulose, because of its widespread natural occurrence is available practically everywhere and in large quantities, does not have a cariogenic effect, is also suitable as a vegetable raw material for vegetarian nutrition, has a neutral inherent taste, has a regulatory effect on digestion and has further positive health benefits. For all the stated advantages the use of cellulose is very cost-effective. In combination with the method according to the invention (see below) the stabilization of flavoring substances can be advantageously achieved without the addition of antioxidants.

The flavoring substance-included celluloses according to the invention allow a particularly good stabilization of the included flavoring substances. The flavoring substance-included celluloses according to the invention can advantageously be stored for long periods without major flavoring substance loss. The flavoring profile of flavoring substance-included celluloses according to the invention can therefore be kept constant over a long period.

In addition, high stability during food processing or preparation is guaranteed. The flavoring substance-included celluloses according to the invention can therefore, by way of example, be used in heating, baking, roasting, frying, cooking, stewing, braising, grilling, steaming, pasteurizing, sterilizing, extruding, conching, sprinkling, interspersing, stirring-in, blending (wet/moist or dry), mixing, kneading, foaming, melting, solidifying, drying and dispersing of foodstuffs. In so doing with the flavoring substance-included celluloses according to the invention in particular losses and undesired reactions of the (included) flavoring substances are reduced or even excluded. In addition, during storage and when the finished or semi-finished foodstuffs are for example kept in canteens, restaurants, catering establishments, at forwarding agencies, in warehouses and in supermarkets as well as at the consumer's, the flavoring substance-included celluloses according to the invention can contribute towards the stabilization of the flavoring substances. Surprisingly, the flavoring substance-included celluloses according to the invention, despite their high stability, in particular during consumption, enable the release of the included flavoring substances, so that these can be clearly perceived by the consumer. The flavoring substance-included celluloses according to the invention are thus particular suitable for "delivery on demand". The flavoring substance-included celluloses according to the invention can also be used to extend the flavoring substance release, wherein the use in chewing gum is of particularly high significance. In addition, a flavoring substance-included cellulose according to the invention of the included flavoring substances can be used in food processing in a targeted manner in order to flavor the food or to mask unpleasant-tasting substances. Preparations or semifinished goods according to the invention intended for nourishment or pleasure are described below.

A further advantage of flavoring substance-included celluloses according to the invention is that their encapsulation medium (cellulose) at least as a rule does not have any cariogenic effect. The use of the flavoring substance-included celluloses according to the invention is therefore particularly recommended in chewing gum, toothpaste and other oral care products, tooth-friendly caramel sweets, sugar-coated pills, pastilles and other applications in particular for freshening the breath and increasing or maintaining oral hygiene.

In addition flavoring substances according to the invention are advantageously suitable as a medium or component of a medium for stimulating bowel function and thus for maintaining intestinal health and preventing (intestinal) diseases. Because of their low calorific value the flavoring substance-included celluloses according to the invention also make no contribution to the body's energy supply and because of their additional satiation-controlling and fat elimination promoting properties they can therefore help to reduce or delay the onset or advance of obesity and thus the disease associated with this. The flavoring substance-included celluloses according to the invention (incorporated into foodstuffs) are dietary fiber and can therefore contribute to maintaining a healthy body and increasing a sense of wellbeing. The flavoring substance-included celluloses according to the invention can be used in a targeted manner to prevent, fight or moderate the diseases mentioned and others. The flavoring substance-included celluloses according to the invention are advantageously at most absorbed by the body in small quantities and do not therefore have to be metabolized in an insulin-dependent manner, so that they can also in particular be used in foodstuffs for diabetics. The flavoring substance-included celluloses according to the invention can control (in particular slow down) the absorption of glucose, wherein a rapid and strong increase in the glucose concentration can be counteracted. It is currently believed that this control is the result of the water binding properties of the cellulose, whereby the viscosity of the bolus in the digestive tract is increased and the absorption of glucose is accordingly slowed. In addition it is possible that cellulose-glucose interactions take place which can likewise delay the absorption of glucose. This fact can also contribute to a feeling of wellbeing in healthy persons, in that, for example, a drop in energy levels as a result of an exaggerated insulin response to very rapidly absorbed carbohydrate can be curtailed, as well as a reduction in cravings for foods, which can occur because of over-control of insulin excretion and the resultant excessively low blood glucose concentration that occurs.

The lipophilic flavoring substances preferably used in the context of the present invention and thus preferably included in a flavoring substance-included cellulose according to the invention belong to various chemical groups, such as for example:

- the group comprising hydrocarbons, such as for example 3-carene; α-pinene; β-pinene; α-terpinene; γ-terpinene; p-cymol; bisabolene; camphene; caryophyllene; cedrene; frame-sene; limonene; longifolene; myrcene; ocimene; valencene; (E,Z)-1,3,5-undecatrien;
- the group comprising aliphatic alcohols, such as for example: hexanol; octanol; 3-octanol; 2,6-dimethylheptanol; 2-methyl-2-heptanol; 2-methyl-2-octanol; (E)-2-hexenol; (E)- and (Z)-3-hexenol; 1-octen-3-ol; mixture of 3,4,5,6,6-pentamethyl-3/4-hepten-2-ol and 3,5,6,6-tetramethyl-4-methyleneheptan-2-ol; (E,Z)-2,6-nonadienol; 3,7-dimethyl-7-methoxyoctan-2-01; 9-decenol; 10-undecenol; 4-methyl-3-decen-5-ol;
- the group comprising aliphatic aldehydes and the acetals thereof such as for example: hexanal; heptanal; octanal; nonanal; decanal; undecanal; dodecanal; tridecanal; 2-methyloctanal; 2-methylnonanal; (E)-2-hexenal; (Z)-4-heptenal; 2,6-dimethyl-5-heptenal; 10-undecenal; (E)-4-decenal; 2-dodecenal; 2,6,10-trimethyl-5,9-undecadienal; heptanal diethylacetal; 1,1-dimethoxy-2,2,5-trimethyl-4-hexene;
- the group comprising aliphatic ketones and oximes thereof, such as for example: 2-heptanone; 2-octanone; 3-octanone; 2-nonanone; 5-methyl-3-heptanone; 5-methyl-3-heptanone oxime; 2,4,4,7-tetramethyl-6-octen-3-one; aliphatic sulfur-containing compounds such as for example: 3-methylthiohexanol; 3-methylthiohexyl acetate; 3-mercaptohexanol; 3-mercaptohexyl acetate; 3-mercaptohexyl butyrate; 3-acetylthiohexyl acetate; 1-menthen-8-thiol;
- the group comprising aliphatic nitriles, such as for example: 2-nonenoic acid nitrile; 2-tridecenoic acid nitrile; 2,12-tridecadienoic acid nitrile; 3,7-dimethyl-2,6-octadienoic acid nitrile; 3,7-dimethyl-6-octenoic acid nitrile;
- the group comprising aliphatic carboxylic acids esters such as for example: (E)- and (Z)-3-hexenyl formate; ethyl acetoacetate; isoamyl acetate; hexyl acetate; 3,5,5-trimethylhexyl acetate; 3-methyl-2-butenyl acetate; (E)-2-hexenyl acetate; (E)- and (Z)-3-hexenyl acetate; octyl acetate; 3-octyl acetate; 1-octen-3-yl acetate; ethyl butyrate; butyl butyrate; isoamyl butyrate; hexyl butyrate; (E)- and (Z)-3-hexenyl isobutyrate; hexyl crotonate; ethyl isovalerate; ethyl-2-methyl pentanoate; ethyl hexanoate; allyl hexanoate; ethyl heptanoate; allyl heptanoate; ethyl octanoate; ethyl-(E,Z)-2,4-decadienoate; methyl-2-octinate; methyl-2-noninate; allyl-2-isoamyl oxyacetate; methyl-3,7-dimethyl-2,6-octadienoate;
- the group comprising acyclic terpene alcohols such as for example: citronellol; geraniol; nerol; linalool; lavandulol; nerolidol; farnesol; tetrahydrolinalool; tetrahydrogeraniol; 2,6-dimethyl-7-octen-2-ol; 2,6-dimethyloctan-2-ol; 2-methyl-6-methylene-7-octen-2-ol; 2,6-dimethyl-5,7-octadien-2-ol; 2,6-dimethyl-3,5-octadien-2-ol; 3,7-dimethyl-4,6-octadien-3-ol; 3,7-dimethyl-1,5,7-octatrien-3-ol; 2,6-dimethyl-2,5,7-octatrien-1-ol; and the formates, acetates, propionates, isobutyrates, butyrates, isovalerates, pentanoates, hexanoates, crotonates, tiglinates, 3-methyl-2-butenoates thereof;
- the group comprising acyclic terpene aldehydes and ketones such as for example: geranial; neral; citronellal; 7-hydroxy-3,7-dimethyloctanal; 7-methoxy-3,7-dimethyloctanal; 2,6,10-trimethyl-9-undecenal; geranyl acetone; and the dimethyl and diethyl acetals of geranial, neral, 7-hydroxy-3,7-dimethyloctanal;
- the group comprising cyclic terpene alcohols such as for example: menthol; isopulegol; alpha-terpineol; terpinenol-4; menthan-8-ol; menthan-1-ol; menthan-7-ol; borneol; isoborneol; linalool oxide; nopol; cedrol; ambrinol;

vetiverol; guaiol; and the formates, acetates, propionates, isobutyrates, butyrates, isovalerates, pentanoates, hexanoates, crotonates, tiglinates, 3-methyl-2-butenoates thereof;

the group comprising cyclic terpene aldehydes and ketones such as for example: menthone; isomenthone; 8-mercaptomenthan-3-one; carvone; camphor; fenchone; alpha-ionone; beta-ionone; alpha-n-methyl ionone; beta-n-methyl ionone; alpha-isomethyl ionone; beta-isomethyl ionone; alpha-irone; alpha-damascone; beta-damascone; beta-damascenone; delta-damascone; gamma-damascone; 1-(2,4,4-trimethyl-2-cyclohexen-1-yl)-2-buten-1-one; 1,3,4,6,7,8a-hexahydro-1,1,5,5-tetramethyl-2H-2,4a-methanonaphthalen-8(5H-)-one; nootkatone; dihydronootkatone; alpha-sinensal; beta-sinensal;

the group comprising cyclic alcohols such as for example: 4-tert.-butylcyclohexanol; 3,3,5-trimethylcyclohexanol; 3-isocamphylcyclohexanol; 2,6,9-trimethyl-Z2,Z5,E9-cyclododecatrien-1-ol; 2-isobutyl-4-methyltetrahydro-2H-pyran-4-ol;

the group comprising cycloaliphatic alcohols such as for example: alpha-3,3-trimethylcyclohexylmethanol; 2-methyl-4-(2,2,3-trimethyl-3-cyclopent-1-yl)butanol; 2-methyl-4-(2,2,3-trimethyl-3-cyclopent-1-yl)-2-buten-1-ol; 2-ethyl-4-(2,2,3-trimethyl-3-cyclopent-1-yl)-2-buten-1-ol; 3-methyl-5-(2,2,3-trimethyl-3-cyclopent-1-yl)pentan-2-ol; 3-methyl-5-(2,2,3-trimethyl-3-cyclopent-1-yl)-4-penten-2-ol; 3,3-dimethyl-5-(2,2,3-trimethyl-3-cyclopent-1-yl)-4-penten-2-ol; 1-(2,2,6-trimethylcyclohexyl)pentan-3-ol; 1-(2,2,6-trimethylcyclohexyl)hexan-3-ol;

the group comprising esters of cycloaliphatic carboxylic acids such as for example: allyl-3-cyclohexyl propionate; allylcyclohexyl oxyacetate; methyldihydrojasmonate; methyl jasmonate; methyl-2-hexyl-3-oxocyclopentane carboxylate; ethyl-2-ethyl-6,6-dimethyl-2-cyclohexene carboxylate; ethyl-2,3,6,6-tetramethyl-2-cyclohexene carboxylate; ethyl-2-methyl-1,3-dioxolane-2-acetate;

the group comprising aromatic hydrocarbons, such as for example styrene and diphenylmethane;

the group comprising araliphatic alcohols such as for example: benzyl alcohol; 1-phenylethyl alcohol; 2-phenylethyl alcohol; 3-phenylpropanol; 2-phenylpropanol; 2-phenoxyethanol; 2,2-dimethyl-3-phenylpropanol; 2,2-dimethyl-3-(3-methylphenyl)propanol; 1,1-dimethyl-2-phenylethyl alcohol; 1,1-dimethyl-3-phenylpropanol; 1-ethyl-1-methyl-3-phenylpropanol; 2-methyl-5-phenylpentanol; 3-methyl-5-phenylpentanol; 3-phenyl-2-propen-1-ol; 4-methoxybenzyl alcohol; 1-(4-isopropylphenyl)ethanol;

the group comprising esters of araliphatic alcohols and aliphatic carboxylic acids such as for example: benzyl acetate; benzyl propionate; benzyl isobutyrate; benzyl isovalerate; 2-phenylethyl acetate; 2-phenylethyl propionate; 2-phenylethyl isobutyrate; 2-phenylethyl isovalerate; 1-phenylethylacetate; alpha-trichloromethylbenzyl acetate; alpha,alpha-dimethylphenylethyl acetate; alpha,alpha-dimethylphenylethyl butyrate; cinnamyl acetate; 2-phenoxyethyl isobutyrate; 4-methoxybenzyl acetate; araliphatic ethers such as for example: 2-phenylethyl methyl ether; 2-phenyl ethyl isoamyl ether; 2-phenyl ethyl-1-ethoxyethyl ether; phenylacetaldehyde dimethylacetal; phenylacetaldehyde diethyl acetal; hydratropaldehyde dimethylacetal; phenylacetaldehyde glycerol acetal;

the group comprising aromatic and araliphatic aldehydes such as for example: benzaldehyde; phenylacetaldehyde; 3-phenylpropanal; hydratropaldehyde; 4-methylbenzaldehyde; 4-methyl phenyl acetaldehyde; 3-(4-ethylphenyl)2,2-dimethylpropanal; 2-methyl-3-(4-isopropylphenyl)propanal; 2-methyl-3-(4-tert.-butylphenyl)propanal; 3-(4-tert.-butylphenyl)propanal; cinnamaldehyde; alpha-butylcinnamaldehyde; alpha-amylcinnamaldehyde; alpha-hexylcinnamaldehyde; 3-methyl-5-phenyl pentanal; 4-methoxybenzaldehyde; 4-hydroxy-3-methoxybenzaldehyde; 4-hydroxy-3-ethoxybenzaldehyde; 3,4-methylenedioxybenzaldehyde; 3,4-dimethoxybenzaldehyde; 2-methyl-3-(4-methoxyphenyl)propanal; 2-methyl-3-(4-methylenedioxyphenyl)propanal;

the group comprising aromatic and araliphatic ketones such as for example: acetophenone; 4-methylacetophenone; 4-methoxyacetophenone; 4-tert.-butyl-2,6-dimethylacetophenone; 4-phenyl-2-butanone; 4-(4-hydroxyphenyl)-2-butanone; 1-(2-naphthalenyl)ethanol; benzophenone;

the group comprising aromatic and araliphatic carboxylic acids and the esters thereof such as for example: benzoic acid; phenylacetic acid; methyl benzoate; ethyl benzoate; hexyl benzoate; benzyl benzoate; methylphenyl acetate; ethylphenyl acetate; geranyl-phenyl acetate; phenylethylphenyl acetate; methyl cinnamate; ethyl cinnamate; benzyl cinnamate; phenylethyl cinnamate; cinnamyl cinnamate; allyl phenoxy acetate; methyl salicylate; isoamyl salicylate; hexyl salicylate; cyclohexyl salicylate; cis-3-hexenyl salicylate; benzyl salicylate; phenylethyl salicylate; methyl-2,4-dihydroxy-3,6-dimethylbenzoate; ethyl-3-phenylglycidate; ethyl-3-methyl-3-phenyl glycidate;

the group comprising nitrogenous aromatic compounds such as for example: 2,4,6-trinitro-1,3-dimethyl-5-tert.-butylbenzene; 3,5-dinitro-2,6-dimethyl-4-tert.-butyl acetophenone; cinnamonitrile; 5-phenyl-3-methyl-2-pentenoic acidnitrile; 5-phenyl-3-methylpentanoic acid nitrile; methyl anthranilate; methyl-N-methyl anthranilate; Schiff bases of methyl anthranilate with 7-hydroxy-3,7-dimethyloctanal, 2-methyl-3-(4-tert.-butylphenyl)propanal or 2,4-dimethyl-3-cyclohexenecarbaldehyde; 6-isopropyl quinoline; 6-isobutyl quinoline; 6-sec.-butyl quinoline; indole; skatole; 2-methoxy-3-isopropylpyrazine; 2-isobutyl-3-methoxypyrazine;

the group comprising phenols, phenyl ethers and phenyl esters such as for example: estragole; anethole; eugenol; eugenyl methyl ether; isoeugenol; isoeugenyl methyl ether; thymol; carvacrol; diphenyl ether; beta-naphthyl methyl ether; beta-naphthyl ethyl ether; beta-naphthyl isobutyl ether; 1,4-dimethoxybenzene; eugenyl acetate; 2-methoxy-4-methylphenol; 2-ethoxy-5-(1-propenyl)phenol; p-cresyl phenyl acetate;

the group comprising heterocyclic compounds such as for example: 2,5-dimethyl-4-hydroxy-2H-furan-3-one; 2-ethyl-4-hydroxy-5-methyl-2H-furan-3-one; 3-hydroxy-2-methyl-4H-pyran-4-one; 2-ethyl-3-hydroxy-4H-pyran-4-one;

the group comprising lactones such as for example: 1,4-octanolide; 3-methyl-1,4-octanolide; 1,4-nonanolide; 1,4-decanolide; 8-decen-1,4-olide; 1,4-undecanolide; 1,4-dodecanolide; 1,5-decanolide; 1,5-dodecanolide; 1,15-pentadecanolide; cis- and trans-11-pentadecen-1,15-olide; cis- and trans-12-pentadecen-1,15-olide; 1,16-hexadecanolide; 9-hexadecen-1,16-olide; 10-oxa-1,16-hexadecanolide; 11-oxa-1,16-hexadecanolide; 12-oxa-1,16-hexadecanolide; ethylene 1,12-dodecanedioate; ethylene 1,13-tridecanedioate; coumarin; 2,3-dihydrocoumarin; octahydrocoumarin.

The lipophilic flavoring substances with a $\log P_{OW}$ of higher than 1.0 preferably used in the context of the present invention or preferably included in cellulose are preferably selected from the group comprising:

acetophenone, allyl capronate, alpha-ionone, beta-ionone, anisaldehyde, anisyl acetate, anisyl formate, benzaldehyde, benzothiazole, benzyl acetate, benzyl alcohol, benzyl benzoate, beta-ionone, butyl butyrate, butyl caproate, butylidene phthalide, carvone, camphene, caryophyllene, cineol, cinnamyl acetate, citral, citronellol, citronellal, citronellyl acetate, cyclohexyl acetate, cymol, damascone, decalactone, dihydrocoumarin, dimethyl anthranilate, dimethyl anthranilate, dodecalactone, ethoxyethyl acetate, ethylbutyric acid, ethyl butyrate, ethyl caprinate, ethyl capronate, ethyl crotonate, ethyl furaneol, ethyl guajacol, ethyl isobutyrate, ethyl isovalerate, ethyl lactate, ethyl methyl butyrate, ethyl propionate, eucalyptol, eugenol, ethyl heptylate, 4-(p-hydroxyphenyl)-2-butanone, gamma-decalactone, geraniol, geranyl acetate, geranyl acetate, grapefruit aldehyde, methyl dihydrojasmonate (e.g. hedione), heliotropin, 2-heptanone, 3-heptanone, 4-heptanone, trans-2-heptenal, cis-4-heptenal, trans-2-hexenal, cis-3-hexenol, trans-2-hexenoic acid, trans-3-hexenoic acid, cis-2-hexenyl acetate, cis-3-hexenyl acetate, cis-3-hexenyl capronate, trans-2-hexenyl capronate, cis-3-hexenyl formate, cis-2-hexyl acetate, cis-3-hexyl acetate, trans-2-hexyl acetate, cis-3-hexyl formate, para-hydroxy benzyl acetone, isoamyl alcohol, isoamyl isovalerate, isobutyl butyrate, isobutyraldehyde, isoeugenol methyl ether, isopropyl methylthiazole, lauric acid, levulinic acid, linalool, linalool oxide, linalyl acetate, menthol, menthofuran, methyl anthranilate, methylbutanol, methylbutyric acid, 2-methylbutyl acetate, methyl capronate, methyl cinnamate, 5-methyl furfural, 3,2,2-methyl cyclopentenolone, 6,5,2-methyl heptenone, methyl dihydrojasmonate, methyl jasmonate, 2-methyl methyl butyrate, 2-methyl-2-pentenoic acid, methylthiobutyrate, 3,1-methylthiohexanol, 3-methylthiohexyl acetate, nerol, neryl acetate, trans,trans,2,4-nonadienal, 2,4-nonadienol, 2,6-nonadienol, 2,4-nonadienol, nootkatone, delta-octalactone, gamma-octalactone, 2-octanol, 3-octanol, 1,3-octenol, 1-octyl acetate, 3-octyl acetate, palmitic acid, paraldehyde, phellandrene, pentanedione, phenylethyl acetate, phenylethyl alcohol, phenylethyl alcohol, phenylethyl isovalerate, piperonal, propionaldehyde, propyl butyrate, pulegone, pulegol, sinensal, sulfurol, terpinene, terpineol, terpinolene, 8,3-thiomenthanone, 4,4,2-thiomethyl pentanone, thymol, delta-undecalactone, gamma-undecalactone, valencene, valeric acid, vanillin, acetoin, ethyl vanillin, ethyl vanillin isobutyrate (=3-ethoxy-4-isobutyryloxybenzaldehyde), 2,5-dimethyl-4-hydroxy-3(2H)-furanone and the derivatives thereof (in this case preferably homofuraneol (=2-ethyl-4-hydroxy-5-methyl-3(2H)-furanone), homofuronol (=2-ethyl-5-methyl-4-hydroxy-3(2H)-furanone and 5-ethyl-2-methyl-4-hydroxy-3(2H)-furanone), maltol and maltol derivatives (in this case preferably ethyl maltol), coumarin and coumarin derivatives, gamma-lactones (in this case preferably gamma-undecalactone, gamma-nonalactone, gamma-decalactone), delta-lactones (in this case preferably 4-methyl delta decalactone, massoia lactone, delta decalactone, tuberose lactone), methyl sorbate, divanillin, 4-hydroxy-2 (or 5)-ethyl-5(or 2)-methyl-3(2H)furanone, 2-hydroxy-3-methyl-2-cyclopentenone, 3-hydroxy-4,5-dimethyl-2(5H)-furanone, acetic acid isoamyl ester, butyric acid ethyl ester, butyric acid-n-butyl ester, butyric acid isoamyl ester, 3-methylbutyric acid ethyl ester, n-hexanoic acid ethyl ester, n-hexanoic acid allyl ester, n-hexanoic acid-n-butyl ester, n-octanoic acid ethyl ester, ethyl-3-methyl-3-phenyl glycidate, ethyl-2-trans-4-cis-decadienoate, 4-(p-hydroxyphenyl)-2-butanone, 1,1-dimethoxy-2,2,5-trimethyl-4-hexane, 2,6-dimethyl-5-hepten-1-al and phenylacetaldehyde, 2-methyl-3-(methylthio)furan, 2-methyl-3-furanthiol, bis(2-methyl-3-furyl)disulfide, furfuryl mercaptan, methional, 2-acetyl-2-thiazoline, 3-mercapto-2-pentanone, 2,5-dimethyl-3-furanthiol, 2,4,5-trimethylthiazole, 2-acetylthiazole, 2,4-dimethyl-5-ethylthiazole, mercapto-3-methyl-1-butanol, 2-acetyl-1-pyrroline, 2-methyl-3-ethylpyrazine, 2-ethyl-3,5-dimethylpyrazine, 2-ethyl-3,6-dimethylpyrazine, 2,3-diethyl-5-methylpyrazine, 3-isopropyl-2-methoxypyrazine, 3-isobutyl-2-methoxypyrazine, 2-acetyl pyrazine, 2-pentylpyridine, (E,E)-2,4-decadienal, (E,E)-2,4-nonadienal, (E)-2-octenal, (E)-2-nonenal, 2-undecenal, 12-methyltridecanal, 1-penten-3-one, 4-hydroxy-2,5-dimethyl-3(2H)-furanone, guajacol, 3-hydroxy-4,5-dimethyl-2(5H)-furanone, 3-hydroxy-4-methyl-5-ethyl-2(5H)-furanone, cinnamaldehyde, cinnamyl alcohol, methyl salicylate, isopulegol and further stereoisomers, enantiomers, positional isomers, diastereomers, cis/trans-isomers or epimers (not expressly mentioned) of these substances.

Flavoring substances to be used according to the invention can in the context of the present invention also be used in combination with one or more flavoring solvent(s). Here use is preferably made of solvents suitable for human consumption. Preferred flavoring solvents are in this respect ethanol, fatty oils, such as cooking oils and in particular vegetable oils such as for example borage oil, thistle oil, groundnut oil, hazelnut oil, coconut oil, pumpkin seed oil, linseed oil, maize germ oil, macadamia nut oil, almond oil, olive oil, pecan nut oil, pistachio kernel oil, rapeseed oil, rice germ oil, sesame seed oil, Soya oil, sunflower oil, walnut oil or wheat germ oil, fractionated coconut oils, which mainly have fatty acid residues with a length of between six and eight carbon atoms (C6- to C8-fatty acids), propylene glycol, diacetine (glycerine diacetate), triacetine (glycerine triacetat), benzyl alcohol, triethyl citrate, ethyl lactate, isopropanol and glycerine. According to a preferred embodiment the flavoring substances to be used according to the invention are mixed with one or more of the abovementioned flavoring solvents and then fed into the method according the invention. The method according to the invention is described further below.

A flavoring substance according to the invention, in particular a flavoring substance-included cellulose designated above as preferred, preferably comprises or consists of
(i) 75 to 99 wt %, preferably 75 to 95 wt % cellulose and
(ii) a total of 1 to 25 wt %, preferably 5 to 25 Wt % included flavoring substances, provided that, as throughout in connection with the present invention, the included flavoring substances are not alkanoic acids with between 1 and 4 C-atoms.

Further preference is for a flavoring substance-included cellulose as described above wherein the cellulose (i) is a
(native) cellulose of vegetable origin,
in particular from wood (in particular from conifers such as pinewood, spruces, firs, larches, Douglas firs, pines or from deciduous trees such as beeches, oaks, lindens, sycamore, poplars, elms, mountain ashes, birches, chestnuts, cherry trees, apple trees, eucalyptus trees), from cottonseed (in particular cotton, linters), from cereals (in particular wheat, rye, oats, barley, millet, maize, rice, spelt, triticale), from bamboo or from sugar cane,
or
a cellulose from micro-organisms.

The obtaining of cellulose from the sources mentioned is generally known in the state of the art.

It is preferably the case for the cellulose (i) of a flavoring substance-included cellulose according to the invention, that this has preferably been obtained from wood, cereal, bamboo or sugar cane and quite particularly preferable that the cellulose has been obtained from cereal (in particular wheat, rye, oats, barley, millet, maize, rice, spelt, triticale).

Further preferred forms of cellulose are described further below.

Depending on its origin and how it has been processed, cellulose has a degree of polymerization of between 200 and 15,000. In a flavoring substance-included cellulose according to the invention the cellulose (i) preferably has a degree of polymerization in the range 1,000 to 12,000, preferably in the range 1,500 to 8,000.

The cellulose (i) of a flavoring substance-included cellulose according to the invention preferably has a low degree of substitution. In the context of the present text, the term degree of substitution means the average number of hydroxyl groups substituted by organic groups per residual glucose molecule.

In a flavoring substance-included cellulose according to the invention, preferably one designated as preferred above, the cellulose (i) preferably has a degree of substitution of less than 0.5, preferably of less than 0.1, and particularly preferably of less than 0.015.

In particular for the application according to the invention in foodstuffs experience has shown that it is advantageous if cellulose has short fiber lengths (for preparations and semi-finished goods intended for nourishment or pleasure according to the invention containing flavoring substance according to the invention see below). The fiber length of the cellulose in flavoring substance-included celluloses according to the invention is preferably 0.1 to 5,000 μm, more preferably 1.0 to 500 μm, and particularly preferably 5.0 to 150 μm. The fiber thickness is preferably 0.5 to 80 μm, more preferably 1.0 to 50 μm and particularly preferably 1.0 to 30 μm.

Accordingly a flavoring substance according to the invention, in particular a flavoring substance-included cellulose designated above as preferred is particularly preferred wherein the cellulose (i) has a fiber length of 0.1 to 5,000 μm, preferably of 1.0 to 500 μm, and particularly preferably of 5.0 to 150 μm.

Preference is for a flavoring substance according to the invention, wherein the cellulose (i) has a fiber thickness of 0.5 to 80 μm, preferably of 1.0 to 50 μm, particularly preferably of 1.0 to 30 μm.

The setting of the cellulose fiber size, i.e. the fiber length and thickness, can take place before or after inclusion of the flavoring substance in the cellulose, i.e. before or after the execution of a method according to the invention (for the producing method according to the invention see below).

As mentioned above, as a rule cellulose occurs in plants along with the accompanying substances lignin and hemicelluloses (polyoses). Cellulose, lignin and hemicellulose normally occur in plants with a close physical connection and serve there as builders. The term "hemicelluloses" designates a group of non-uniform vegetable polysaccharides, which comprise pentoses, hexoses and uronic acids. Hemicelluloses are predominantly made up of the monomeric building blocks of D-glucose, D-mannose, D-galactose, D-xylose, L-arabinose, L-rhamnose, D-glucuronic acid and 4-O-methyl-D-glucuronic acid and as a rule have a relatively low degree of polymerization of up to 200. Hemicelluloses are split into four types: galactoglucomannan, arabino-glucuronoxylan, glucuronoxylan and glucomannan. In the context of the present text, the term "hemicelluloses" therefore in each case refers to the group of polysaccharides described above, individually or in a mixture with one another, i.e. "hemicelluloses" can mean both a particular one of these polysaccharides and a mixtures of different polysaccharides.

A further aspect of the present invention concerns a mixture, comprising or consisting of
(i+ii) flavoring substance-included cellulose according to the invention (as described above) and
(iii) accompanying substances Accompanying substances and/or
(iv) water.

In the context of the present text, accompanying substances means in particular lignin and/or hemicellulose (as described above). Here the water (iv) includes both—where present—the water content of the cellulose, and water additionally contained in the mixture according to the invention.

A mixture according to the invention (as described above) preferably comprises or consists of
(i+ii) 70 to 99.8 Wt % flavoring substance-included cellulose according to the invention (as described above) and
(iii) in total 0.1 to 30 Wt %, preferably 15 to 30 Wt % accompanying substances and/or
(iv) 0.1 to 15 Wt %, preferably 1 to 10 Wt % water,
in each case in relation to the total weight of the mixture.

Particular preference is for a mixture according to the invention (as described above), wherein the accompanying substances (iii) are selected from the group comprising hemicellulose and lignin, wherein
the total quantity hemicellulose in relation to the total weight of the accompanying substances (iii) is preferably in the range 70 to 100 Wt %, preferably in the range 88 to 99.9 Wt % and/or the total quantity of lignin in relation to the total weight of the accompanying substances (iii) is especially in the range 0 to 30 Wt %, preferably in the range 0.1 to 12 Wt %.

Apart from the abovementioned cellulose sources or celluloses (native, possibly purified cellulose (with a high degree of purity) or cellulose in a mixture with accompanying substances from plants; cellulose from micro-organisms) for the purposes of the present invention other celluloses can be advantageously used and therefore contained in a flavoring substance-included cellulose according to the invention, such as for example modified celluloses, in particular with acids (e.g. hydrochloric acid) or bases (e.g. sodium hydroxide, potassium hydroxide, liquid ammonia) or celluloses treated first with acids and then with bases or first with bases and then with acids such as microcrystalline cellulose, mercerized cellulose or also regenerated cellulose as well as powdered cellulose.

A particularly advantageous and therefore particularly preferred component of a flavoring substance-included cellulose according to the invention or a mixture according to the invention as described above is a cellulose treated with one or more bases, in particular a cellulose treated with NaOH (preferably with a concentration of between 10 and 15% or more). During such treatment cellulose converts to the cellulose II form. As mentioned above, the cellulose treated with one or more base(s) can then be neutralized with one or more acids (in doing so the cellulose II form is retained). With flavoring substance according to the invention, comprising a cellulose (i), wherein the cellulose is a cellulose II, a particularly high oxidation stability of included flavoring substances is advantageously achieved.

Accordingly, particular preference is for a flavoring substance according to the invention, preferably a flavoring substance-included cellulose designated above as preferred, wherein the cellulose (i) is a cellulose II. In particular the cellulose (i) is preferably a cellulose treated with one or more bases, preferably a cellulose treated with NaOH. Particular preference is thus also for a mixture according to the invention (as described above) comprising such a flavoring substance-included cellulose.

A cellulose treated with one or more bases is preferably washed out with water prior to its use as a component of a flavoring substance-included cellulose according to the invention.

Through the use of such a modified cellulose in the context of the present invention a particularly high oxidation stability of included flavoring substances is advantageously achieved.

Theoretically suitable crystalline modifications of the celluloses to be used or contained according to the invention are, for example, cellulose I (native cellulose), cellulose II, cellulose III, cellulose IV or non-crystalline (amorphous) cellulose, wherein cellulose II is particularly preferred as explained above.

In the context of the present text, the term "cellulose" includes all the said cellulose types unless otherwise stated in the individual cases.

A next aspect of the present invention concerns a method for producing a flavoring substance-included cellulose, comprising the following steps:

(I) inclusion of one or more primary swelling agent(s) (A) in cellulose;
(III) partial or complete replacement of included swelling agents by one, two, three, four or more flavoring substances, providing that the flavoring substances are not alkanoic acids with between 1 and 4 C-atoms,
so that the flavoring substances are included in the cellulose.

For (a) flavoring substances and (b) cellulose to be used by preference according to the invention that stated above applies by analogy.

According to a preferred embodiment of this method the present invention concerns a method for producing a flavoring substance-included cellulose (as described above), wherein swelling agent included in step (III) is only partially replaced. Here the method according to the invention preferably also contains the following step:

(IV) removal of included swelling agents that have not been replaced by flavoring substances.

Further preference is for a method according to the invention for producing a flavoring substance-included cellulose (as described above), wherein in step (III) a proportion of 50% or more, preferably 80% or more, with particular preference for 90% or more, and with quite particular preference for 99% or more of the flavoring substances used is included in the cellulose. A person skilled in the art will be able to infer from the statements in the present description and the examples given below the necessary criteria for achieving these values.

Particular preference is for a method according to the invention for producing a flavoring substance-included cellulose (as described above), which also contains the following step:

(II) partial or complete replacement of included primary swelling agents (A) by one or more secondary swelling agent(s) (B), so that this (these) is (are) included in the cellulose,
and then optionally the step:
(IIb) partial or complete replacement of secondary swelling agents (B) included in cellulose by one or more further secondary swelling agent(s) (B)
and repetition of this step as necessary.

In connection with the present invention, the term "swelling agent" designates the substances that can be embedded in the molecular structure of cellulose (that is to say "included" within the meaning of the above definition of inclusion compounds), with the exception of the flavoring substances to be used in the method according to the invention; these are indeed likewise included in cellulose, but in the context of the present text are not referred to as "swelling agents".

In the context of the present text the term "primary swelling agent" designates substances which are able to embed themselves in the molecular structure of non-pre-swollen cellulose. The ability of the primary swelling agents to embed themselves in cellulose, is based on the fact that they infiltrate the cellulose structures and are able there to release hydrogen bridge bonds between the OH groups of the residual glucose molecules. In the context of the present text the embedding (inclusion) of the primary swelling agent is also designated as the "first swelling" of the cellulose. Primary swelling agents (A) preferred according to the invention are mentioned further below.

In the context of the present text, the term "secondary swelling agent" designates substances which, if included in cellulose, in step (III) can be replaced by the flavoring substances to be used or included. This characteristic stems from the fact that the secondary swelling agents have the advantageous ability to mix in a very broad range of concentrations, without phase separation, with the said flavoring substances. Furthermore, the secondary swelling agents advantageously maintain the swollen state of the cellulose and allow a better distribution of the flavoring substances and their positioning between the cellulose chains. Secondary swelling agents (B) preferred according to the invention are mentioned further below. In the context of the present text, the step of including secondary swelling agents (B) in (pre-swollen) cellulose is designated as the "second swelling" of the cellulose.

According to the above statements in the context of a preferred method according to the invention for producing a flavoring substance-included cellulose first cellulose is (pre-) swollen with one or more primary swelling agent(s) (A), i.e. the primary swelling agents (A) are included in cellulose (step (I)). Then the included primary swelling agents (A) may preferably be partially or completely replaced by secondary swelling agents (B), whereby in turn the secondary swelling agents (B) are included in cellulose (step (II)). Optionally the included secondary swelling agents (B) are in turn partially or completely replaced by further secondary swelling agents (B) (step (IIb)). In a next step (III) the included swelling agents, thus included primary swelling agents (A) and/or included secondary swelling agents (B), are partially or completely, preferably as far as possible completely, replaced by flavoring substances to be used according to the invention, so that these are included in cellulose. Where in step (III) included swelling agents are only partially replaced by flavoring substances, a further step (IV) preferably takes place, in which the included swelling agents not replaced by flavoring substances, e.g. remaining quantities of included primary swelling agents (A) and/or included secondary swelling agents (B), are removed.

Preferably in a method according to the invention for producing a flavoring substance-included cellulose, particularly in a method designated as preferred, one, several or all of the primary swelling agent(s) (A) is (are) selected from the Group (a1) comprising water, glycerine, propylene glycol, formic acid, ammonia, aqueous solutions of metal hydroxides, in particular sodium hydroxide and potassium hydroxide, and mixtures thereof; preferably from the group comprising water, aqueous solutions of sodium hydroxide and aqueous solutions of potassium hydroxide, or the group (a2) comprising acetic acid (glacial acetic acid).

Where in the method according to the invention primary swelling agents (A) from group (a1) are used, i.e. are included in the cellulose, these are preferably in the context of a step (II) (as described above) replaced by secondary swelling agents (B).

Where in the method according to the invention primary swelling agents (A) from group (a2) are used, i.e. are included in the cellulose, these are preferably either first replaced by secondary swelling agents (B) (see step (II)) or directly by one or more flavoring substances (as described above; see step (III)). Primary swelling agents (A) from group (a2) are suitable in particular advantageously well-suited for being replaced in the included state by the flavoring substances to be used in accordance with the invention, so that the flavoring substances are included in the cellulose; primary swelling agents from group (a2) are thus simultaneously also secondary swelling agents; these are also referred to as universal swelling agents.

Accordingly the present invention preferably concerns a method for producing a flavoring substance-included cellulose (as described above), wherein the method includes a first step (II) (as described above) and the or one, several or all of the primary swelling agent(s) (A) to be replaced is (are) selected from the group (a1) comprising water, glycerine, propylene glycol, formic acid, ammonia, aqueous solutions of metal hydroxides, in particular sodium hydroxide and potassium hydroxide, and mixtures thereof; preferably from the group comprising water, aqueous solutions of sodium hydroxyide and aqueous solutions of potassium hydroxide;

or the method does not include a step (II) as defined in claim 12 and the or one of the primary swelling agent(s) (A) is selected from the group (a2) comprising acetic acid (universal swelling agent).

Preferably the or one, several or all of the secondary swelling agent(s) (B) in a method according to the invention for producing a flavoring substance-included cellulose (as described above) is (are) selected from the group comprising ethanol, propanol, butanol, butyric acid, propionic acid and mixtures thereof; preferably from the group comprising ethanol and propanol.

In step (I), i.e. during the first swelling a single primary swelling agent (A) from group (a1), a mixture of different primary swelling agents (A) from group (a1), a single primary swelling agent from group (a2), a mixture of one or more primary swelling agent(s) (A) from group (a1) and a primary swelling agent from group (a2) or a mixture of one or more primary swelling agent(s) (A) from groups (a1) and/or (a2) and one or more secondary swelling agents (B), preferably one or more swelling agents designated above as preferred, are preferably used.

According to a further embodiment the present invention thus preferably concerns a method according to the invention as described above for producing a flavoring substance-included cellulose, wherein in step (I) apart from one or more primary swelling agent(s) (A) additionally one or more secondary swelling agent(s) (B) is (are) used. According to this embodiment the primary and secondary swelling agents are both added in step (I), with the first swelling (as described above) then taking place routinely by the primary swelling agent (A), i.e. before secondary swelling agents are included in the cellulose, one or more of the primary swelling agent(s) (A) used is (are) included in the cellulose, in order to thereby pre-swell the cellulose.

The inclusion or one or more swelling agent(s) in cellulose in the context of an inclusion step according to the invention step (I), step (II) or step (IIb) preferably takes place by direct mixing of the swelling agent(s) to be included and the cellulose or indirectly by vaporization or condensation of the swelling agent(s) onto the cellulose. Details of these methods are described further below.

The swelling agents (A) and/or (B) to be included which are used are volatile, with particular preference for slightly volatile, substances.

The method according to the invention for producing a flavoring substance-included cellulose (as described above), is preferably a method wherein the or one, several or all of the primary swelling agent(s) (A) and/or secondary swelling agents (B) used in steps (I), (II), or IIb) has (have) a higher vapor pressure than the, or one, several or all of the flavoring substance(s) used in step (III).

More preferably, a method according to the invention is a method for producing a flavoring substance-included cellulose (as described above), wherein in a step ((II) or (IIb) secondary swelling agents (B) are used, which have a higher vapor pressure than the or one, several or all of the flavoring substance(s) used in step (III).

Greater preference is for a method for producing a flavoring substance-included cellulose as described above, wherein a, or one, several or all of the flavoring substance(s) used in step (III) has (have) a $\log P_{OW}$ of greater than 1.0, preferably of greater than 1.5, preferably greater than 2.0, more preferably greater than 3 and particularly preferably greater than 4.

Particular preference is for a method for producing a flavoring substance-included cellulose (as described above), wherein the total proportion of the flavoring substances used in step (III) with a $\log P_{OW}$ of greater than 1.0 in relation to the total quantity of the flavoring substances used in step (III) is preferably at least 10%, more preferably at least 30% and especially preferably at least 50%.

Further preference is for a method for producing a flavoring substance-included cellulose as described above wherein the cellulose used in step (I) is a (native) cellulose of vegetable origin, in particular from wood (in particular from conifers such as pinewood, spruces, firs, larches, Douglas firs, pines or from deciduous trees such as beeches, oaks, lindens, sycamore, poplars, elms, mountain ashes, birches, chestnuts, cherry trees, apple trees, eucalyptus trees), from cottonseed (in particular cotton, linters), from cereals (in particular wheat, rye, oats, barley, millet, maize, rice, spelt, triticale), from bamboo or from sugar cane, or a cellulose from micro-organisms.

Particular preference is for a method according to the invention for producing a flavoring substance-included cellulose as described above, wherein the cellulose used in step (I) is a modified cellulose, in particular a cellulose as described above treated first with acids (e.g. hydrochloric acid) or bases (e.g. sodium hydroxide, potassium hydroxide, liquid ammonia) or first with acids and then with bases or first with bases and then with acids.

That stated further above concerning the origin or source of the cellulose and cellulose types preferably applies by analogy to the cellulose to be used in step (I) in accordance with the invention.

Quite particular preference is therefore also for a method according to the invention for producing a flavoring substance-included cellulose as described above, wherein the cellulose used in step (I) is a cellulose II.

In particular the cellulose used in step (I) is therefore by analogy with the above statements preferably a cellulose, which prior to step (I) has been treated with one or more base(s), in particular with NaOH (preferably with a concentration of 10 to 15% or higher). Thus a method as described above for producing a flavoring substance-included cellulose preferably includes prior to step (I) the following step:

preparation of native (possibly purified) cellulose and treatment of the cellulose with one or more base(s), in particular with NaOH (preferably with a concentration of 10 to 15% or higher), so that the native cellulose converts into cellulose II form.

Furthermore, following treatment with one or more base(s) the cellulose can be neutralized with one or more acids (as described above).

As described above, a cellulose treated with one or more base(s) prior to use in step (I) will preferably be washed out with water.

By using such a modified cellulose in the context of the present invention advantageously a particularly high oxidation stability of included flavoring substances is achieved. A method according to the invention for producing a flavoring substance-included cellulose as described above, wherein the cellulose used in step (I) is (mainly) in the form of cellulose II, is therefore particularly preferred.

Depending on the preceding treatment of native cellulose (i.e. the form cellulose I) prior to step (I) when used in step (I) this cannot just be present in the form cellulose I or cellulose II (as described above), but also in the form cellulose III or cellulose IV. Depending on the reaction conditions selected the cellulose in the course of the method according to the invention can also be present in differing forms or convert to different forms of cellulose. Thus cellulose for example when swelling in liquid ammonium can convert to cellulose III or when swelling in glycerine at temperatures in excess of 200° C. can convert to cellulose IV.

Particular preference is for a method for producing a flavoring substance-included cellulose as described above, wherein the cellulose used in step (I) has a degree of polymerization in the range 200 to 15,000, preferably in the range 1,000 to 12,000 and particularly preferred 1,500 to 8,000.

Further preference is for a method for producing a flavoring substance-included cellulose as described above, wherein the cellulose used in step (I) has a degree of substitution of less than 0.5, preferably less than 0.1, and quite particularly preferably less than 0.015.

For the cellulose to be used according to the invention in step (I) that stated further above on the cellulose contained in a flavoring substance-included cellulose according to the invention concerning fiber size (fiber length and thickness) applies by analogy.

As a rule celluloses contain amorphous and crystalline portions. The celluloses used in the invention can generally have any crystallinity. For the purpose of a higher stability of the flavoring substance-included cellulose according to the invention the cellulose to be used in step (I) preferably has a crystallinity of 10 to 90%, with particular preference for 15 to 70%. Microcrystalline celluloses or bacterial celluloses (e.g. celluloses obtained from bacteria) in particular have a high crystallinity. The methods known to a person skilled in the art for determination of crystallinity are, for example, X-ray diffraction and determination of the iodine-absorption power.

So particular preference is for a method for producing a flavoring substance-included cellulose as described above, wherein the cellulose used in step (I) has a crystallinity of 10 to 90%, preferably of 15 to 70%.

The celluloses to be used can have any specific surface area. Preferably the specific surface area, with water as the absorption medium, is however approximately 500,000 $cm^2/g$ to approximately 10,000,000 $cm^2/g$, preferably 1,000,000 $cm^2/g$ to 7,000,000 $cm^2/g$ and particularly preferably 2,000,000 $cm^2/g$ to 5,000,000 $cm^2/g$. Here the specific surface area should preferably be calculated from the water vapor absorption using the BET model. The specific surface area can be determined using gravimetric methods, or also in specially automated apparatus such as the DVS 1000 from Surface Measurement Systems LTD, London.

Further preference is accordingly for a method for producing a flavoring substance-included cellulose as described above, wherein the cellulose used in step (I) has a specific surface area of 50,000 to 10,000,000 $cm^2/g$, preferably 1,000,000 to 7,000,000 $cm^2/g$, and particularly preferably 2,000,000 to 5,000,000 $cm^2/g$.

As already mentioned above, apart from cellulose, depending on the origin of the cellulose, various types and quantities of hemicelluloses (see description further above) can be present with this mixture. Likewise a small proportion of lignin may be present. The use of celluloses present in a mixture with accompanying substances in step (I) leads, as will be explained further below in the examples, to clear advantages compared with the use of pure cellulose. Celluloses with accompanying substances allow a higher loading or/and simplified production.

Accordingly a method for producing a flavoring substance-included cellulose (as described above) is particularly preferred wherein in step (I) the cellulose is present in a mixture with hemicellulose and/or lignin, wherein the proportion of hemicellulose in relation to the total weight of cellulose, hemicellulose and lignin is 0.001 to 80 Wt %, preferably 5 to 50 Wt %, and particularly preferably 15 to 40 Wt %, and/or the proportion of lignin in relation to the total weight of cellulose, hemicellulose and lignin is 0.01 to 10 Wt %, preferably 0.1 to 8 Wt % and particularly preferably 1 to 7 Wt %.

Through processing according to the invention of the celluloses the previously mentioned characteristics can change, wherein in particular a reduction in the quantity of cellulose-accompanying substances (hemicelluloses, lignin) can occur. For example, the treatment with one or more bases and subsequent washing out with water (as described above)—as observed in our own investigations—often leads to a reduction in the quantity of hemicelluloses.

The mixing of (primary or secondary or possibly primary and secondary) swelling agents and (possibly pre-swollen) cellulose in step (I), (II) or (IIb) is preferably carried as a function of the proportions of swelling agents used with suitable equipment. When using relatively small quantities of swelling agent (swelling agent content in the swelling agent mixture approximately 20 to 70 Wt %) the mixtures generally have the characteristics of solids and are therefore preferably mixed with known mixers such as for example plough share mixers and drum mixers. Average quantities of swelling agents (swelling agent content in the cellulose-swelling agent mixture approximately 70-80 Wt %) result in a pasty consistency of the mixture and are therefore preferably processed with equipment that is able to handle high viscosities, such as kneaders and extruders. Very high quantities of swelling agents (swelling agent content in the cellulose-swelling agent mixture approximately 80 Wt % and above) are preferably processed in simple vessels such as for example containers, tanks and impeller type mixers if necessary with the possibility of heating. Here the stated swelling agent contents serve as guide values only, since the origin and possibly any pre-treatment of the cellulose have a considerable effect on the structural form and the viscosity and as a result also on the selection of the equipment to be used. A person skilled in the art will be aware of the criteria for selection of the corresponding equipment.

The swelling time, i.e. the duration of mixing in an inclusion step according to the invention step (I), step (II) or step (IIb) will be determined by a person skilled in the art as a function of the cellulose used (for preferred celluloses to be used see above), the swelling agent(s) (for preferred swelling agents to be used see above), the swelling agent concentrations and the swelling method selected. The necessary duration of swelling in each case (i.e. the duration for inclusion of the swelling agent) is highly dependent upon the temperature. As a rule an increase in temperature leads to an acceleration in swelling, e.g. the inclusion of the desired swelling agents. At low temperatures (e.g. at ambient temperature) for sufficient swelling of the cellulose experience shows that approximately 12 to 36 hours are required, while at high temperatures (e.g. 70 to 280° C.) generally only a few minutes (approximately 2 to 60 minutes) are necessary. Other temperature-time regimes can be easily worked out by a person skilled in the art.

Preferably the swelling in the context of an inclusion step according to the invention step (I), step (II) or step (IIb) takes place at atmospheric pressure and at the boiling temperature of the swelling agent(s) to be included or at a temperature of up to 20° C. below this. Swelling under a pressure burden is in many cases preferably carried out in order to increase the boiling temperature of the swelling agent and reduce the swelling time. Further preference is often for the use of a pressure drop, wherein swelling agent and cellulose are first exposed to a high pressure burden and then the pressure is suddenly dropped. Furthermore, following an inclusion step according to the invention step (I), in particular when water is used as a primary swelling agent (A), freezing of the swelling agent preferably takes place. As a result of the increase in volume of the swelling agent (in particular of water) during freezing the cellulose fibers are dilated by the included swelling agent and an ensuing swelling, i.e. a subsequent inclusion, is thereby facilitated. In addition the swelling process in the context of an inclusion step according to the invention (step (I), step (II) or step (IIb)) is preferably supported by mechanical aids such as stirrers, mixers, dispersers or mills.

As described above, the inclusion of one or more swelling agents in cellulose in the context of an inclusion step according to the invention (step (I), step (II) or step (IIb)) need not take place by mixing (as described above), but can take place indirectly by vaporization or condensation of the swelling agent(s) onto the cellulose.

For vaporization the (possibly pre-swollen) cellulose is preferably treated with a gas mixture enriched with the swelling agent to be included. The gas mixture preferably comprises steam given off by the boiling swelling agent to be included or a boiling swelling agent mixture. Thus the (possibly pre-swollen) cellulose, by way of example embedded in cloths, filters or sieves above the boiling swelling agent or the boiling swelling agent mixture is vaporized. Alternatively the (possibly pre-swollen) cellulose is preferably treated in distillation apparatus or in fluidized beds with the swelling agent or a swelling agent mixture to be included in the steam.

Here condensation of the steam onto the fibers or onto cold parts of the apparatus can take place, so that the swelling preferably takes place in a combined manner via a swelling agent from the gas phase and a swelling agent from a liquid phase. Here cellulose-swelling agent mixtures with a swelling agent content of approximately 40 to 70 Wt % are preferably used.

Furthermore swelling agent can be included in the (possibly pre-swollen) cellulose by combined vaporization and condensation. For this advantageously relatively small quantities of the swelling agent to be included are actually sufficient (swelling agent content in the cellulose-swelling agent mixture of approximately 20 to 70 Wt %, preferably 50 to 70 Wt %). For this purpose the swelling agent and cellulose are preferably heated in a sealed vessel and then cooled, so that the swelling takes place through a combination of both the gas phase and the condensation of the swelling agent.

For the execution of the method according to the invention for the first swelling (step (I)) preferably a minimum quantity of primary swelling agent (A) should be used. This minimum quantity of primary swelling agent (A) is particularly advantageous or, depending on how the method is designed, essential in order that the primary swelling agents (A) can take on the function of the (first) swelling. Below this minimum quantity there is a danger that this will not swell or not sufficiently swell the cellulose and in some circumstances even bring about or promote the opposite of swelling, i.e. a depletion, which in particular in the primary swelling agent (A) of water is the case. The quantity of primary swelling agent (A) to be used is as a rule at least 15 Wt %, preferably at least 20 Wt %, in relation to the total weight of primary swelling agents (A) and cellulose and—where present—accompanying substances in the starting mixture ($M_I$). Particular preference is therefore for a method for producing a flavoring substance-included cellulose as described above, wherein in step (I) prior to inclusion of the swelling agent the proportion of primary swelling agents (A) in a starting mixture ($M_I$) comprising cellulose, primary swelling agent (A) and additionally possibly hemicellulose and/or lignin is at least 20 Wt %, preferably at least 30 Wt %, preferably at least 40 Wt %, in relation to the total weight of cellulose, primary swelling agent (A), hemicellulose and lignin in the starting mixture ($M_I$). In order to achieve a higher flavoring substance loading in the product, i.e. of the flavoring substance-included cellulose, it is as a rule advantageous to use at least 40 Wt % of primary swelling agents (A).

Depending in the nature, origin and prior treatment of the cellulose to be used according to the invention the water content of this may vary at the start of the method according to the invention.

Since in the context of the present invention water constitutes a primary swelling agent (A) from group (a1) (as described above), the water content that may at the start of step (I) of the method according to the invention (still) be in the cellulose is counted towards the quantity of primary swelling agents (A), in particular with regard to the stated quantities of the swelling agent proportions in the starting mixtures. Where in the context of the present text, therefore, the water content of the cellulose is mentioned, according to the nature, origin, prior treatment of the cellulose and design of the method according to the invention and the swelling agents used therein, this will include both water which is used as a primary swelling agent (A) within the meaning of the present invention, and water which results from the cellulose to be used according to the invention at the start of the method according to the invention.

In the context of the present invention the term "starting mixture ($M_I$)" designates a mixture that exists at the start of the step (I) according to the invention (inclusion of one or more primary swelling agent(s) (A) in cellulose), which includes cellulose to be used according to the invention, primary swelling agent (A) to be included in the cellulose and also possibly hemicellulose and/or lignin.

The method according to the invention can also be performed with high excesses of swelling agent. For performing the method, however, as a rule it is sufficient if during a treatment step the primary swelling agent content in the said starting mixture ($M_I$) is a maximum of 95 Wt %, preferably a maximum of 90 Wt % and particularly preferably a maximum of 80 Wt %, in relation to the total weight of cellulose, primary swelling agent (A), hemicellulose (where present) and lignin (where present) in the starting mixture ($M_I$).

Particular preference is therefore for a method for producing a flavoring substance-included cellulose (as described above), wherein in step (I) prior to inclusion of swelling agent the proportion of primary swelling agents (A) in a starting mixture ($M_I$) comprising cellulose, primary swelling agent (A) and additionally possibly hemicellulose and/or lignin is in the range 20 to 95 Wt %, preferably in the range 30 to 90 Wt %, particularly preferably in the range 40 to 80 Wt %, in relation to the total weight of cellulose, primary swelling agent (A), hemicellulose (where present) and lignin (where present) in the starting mixture ($M_I$).

Where during the first swelling, i.e. the inclusion of primary swelling agents (A) in cellulose, high swelling agent excesses are used and the method includes a step (II) as defined above (replacement of primary swelling agent by secondary swelling agent), it is advantageous, between step (I) and step (II) to partially remove swelling agent that has not been included, e.g. by filtering, pressing, centrifuging and/or drying. The aim is to reduce the content of primary swelling agent to a level that allows maintenance of the swelling state of the cellulose (at least for a certain period) but which nevertheless promotes the embedding of the flavoring substances. Too high a content of primary swelling agent would on the other hand hamper the embedding of flavoring substances.

As a rule (i.e. depending on the design of the method) complete removal is not recommended here, since the swelling, i.e. the inclusion of the swelling agent is reversible and if the removal is too thorough a (partial) reversion of the cellulose into the unswollen state can be caused (depletion), so that the secondary swelling agents (B) in step (II) cannot be included to the desired extent. This fact should in particular be taken into account when reducing the proportion of swelling agent by drying, in particular when drying by convection drying, contact drying or dielectric drying. During purely mechanical removal of the swelling agent, in particular the water swelling agent, e.g. by filtering, pressing and centrifuging on the other hand a reversion to the unswollen state is not expected, i.e. even a complete removal of swelling agent that has not been included as a rule does not have a negative effect. With the application of freeze-drying (for details of freeze-drying see below) depletion is not expected. For here the structure imparted by the ice, according to our own investigations, despite the complete removal of the swelling agent, in particular the water swelling agent, leads to the cellulose remaining in a "quasi-swollen", activated state. Through further treatment with a secondary swelling agent (without the need for the presence of a primary swelling agent) the swollen state can be recreated and an inclusion of the flavoring substances can take place. According to our own investigations, the quasi-swollen state is at its most stable when water is excluded as far as possible (for when there is contact with small quantities, i.e. for a water content of less than 15 Wt %, there is a danger of the cellulose changing from the semi-swollen state to the unswollen state).

When mixtures of cellulose and hemicelluloses (and possibly lignin) are used swelling and depletion can be carried out repeatedly one after another in a reversible manner, without a reduction in the inclusion potential of the cellulose taking place. Where the cellulose prior to step (I) has been treated with strong bases (in particular sodium hydroxyide solution, potassium hydroxide solution above a concentration of approximately 17%) and cleaned and in step (I) is not present in a mixture with hemicellulose (and possibly lignin), this reversibility following drying no longer applies. If this cleaned (i.e. rid of hemicellulose and possibly lignin) cellulose is dried once (i.e. as far as a water content of less than 20 Wt %; that stated above concerning the water content of the cellulose applies here by analogy) the inclusion potential (ability to form the flavoring substance-included celluloses according to the invention) of the cellulose is impaired to some extent and possibly irreversibly. This manifests itself in a lower loading with flavoring substances and may even make the inclusion of the flavoring substances impossible. In order to maintain the inclusion potential the cellulose following cleaning can without drying preferably be stored in the moist state. In many cases, however, this causes microbial problems. As a rule these problems do not arise if a mixture comprising (as yet un-cleaned) cellulose, which is still present in a mixture with hemicellulose (as described above) is used in step (I), since hereby the cellulose as a rule retains its inclusion potential even in the dry state, so that it can be stored for a long period without problems (and advantageously not necessarily in the moist state) and only when needed solubilized and if necessary cleaned (rid of hemicellulose).

Prior to a second swelling, i.e. prior to step (II) or step (IIb) the proportion of included swelling agent is preferably at least 5 Wt %, preferably at least 10 Wt % and particularly preferably between 20 and 50 Wt % in relation to the total weight of cellulose, hemicellulose (where present), lignin (where present) and included swelling agent. Since the swollen state of the cellulose at very low swelling agent residue proportions can only be maintained for a short time, immediate further processing is preferable. It is also the case here that when freeze-drying is used (as described further below)) does not apply. In the case of freeze-drying the proportion of included swelling agent, in particular when using the swelling agent water, accordingly also drops to values in the range 0 to 5 Wt % with the swollen state being extensively maintained. Advantageously in this way better storage capability (in particular between steps (I) and (II)) is achieved.

According to the primary swelling agents (A) selected, the cellulose pre-swollen in step (I) is possibly treated in step (II) with secondary swelling agents (B). Advantageously in doing so primary swelling agent that is incompatible with the flavoring substances to be included in step (III) is partially or completely replaced by compatible secondary swelling agent (B). Compatibility within the meaning of this invention exists in particular if the flavoring substances to be included have good or preferably total solubility in the swelling agents or swelling agent mixtures that they are to replace. A second swelling by a step (II) is therefore in particular advantageous if the flavoring substances to be included are not or largely not soluble in the primary swelling agents (A) from step (I). When using primary swelling agents (A) from group (a2) in step (I) their replacement by secondary swelling agents (B) is unnecessary, because the swelling agents from group (a2) can be replaced by flavoring substances to be used according to the invention, but replacement by secondary swelling agents can be carried out as an option. Quantities, method parameters and equipment for the second swelling are essentially identical to those of the first swelling. The second swelling, like the first swelling, can be carried out via the liquid phase, gas phase or a combination of the liquid and gas phases (for details see the description further above).

Following swelling in step (II) further swellings with further secondary swelling agents (B) can be carried out in a similar manner.

Prior to replacement of the included swelling agents by flavoring substances in step (III) the included swelling agent proportion in the cellulose should be set at an optimum value. Therefore for a method for producing a flavoring substance-included cellulose (as described above) it is preferably the case that the included (primary and/or secondary) swelling agent to be replaced in step (III) is a component of a starting mixture ($M_{III}$), containing cellulose, included and possibly (residual quantities of) non-included (primary and/or secondary) swelling agent and possibly hemicellulose and/or lignin, wherein the total proportion of included and non-included swelling agent is in the range 5 to 90 Wt %, preferably in the range 10 to 70 Wt %, particularly preferably in the range 20 to 50 Wt %, in relation to the total weight of cellulose, included and not included swelling agent, hemicellulose and lignin in the starting mixture ($M_{III}$).

In the context of the present text, the term "starting mixture ($M_{III}$)" designates a mixture that exists at the start of the step (III) according to the invention (replacement of included swelling agents by flavoring substance), which includes cellulose (pre-swollen by primary and/or secondary swelling agent according to step (I), (II) or (IIb)), included and possibly (residual quantities of) non-included (primary and/or secondary) swelling agent and additionally possibly hemicellulose and/or lignin, but still no flavoring substances to be included.

Regarding the proportion of swelling agent in the cellulose prior to replacement of the included swelling agent by flavoring substances in step (III) it is additionally the case that a method for producing a flavoring substance-included cellulose as described above is particularly preferred, wherein included primary swelling agent (A) to be replaced is in step (III) a component of the starting mixture ($M_{III}$), which contains cellulose, included and possibly (residual quantities of) non-included (primary and/or secondary) swelling agent and possibly hemicellulose and/or lignin, wherein the ratio of weight of the total quantity of (included and possibly non-included) primary swelling agent (A) to the total quantity of cellulose and possibly hemicellulose and/or lignin in the starting mixture ($M_{III}$) is between 1:4 and 1:10,000, preferably between 1:9 and 1:10,000, and especially preferably between 1:10 and 1:10,000. These ranges of values should in particular be adhered to for water as the primary swelling agent (A), since a water content that is too high, i.e. above the stated ratios, can hinder or even prevent the inclusion of flavoring substances (that stated above concerning an excessive content of primary swelling agent and the associated complications in embedding the flavoring substances applies here by analogy). When using high swelling agent excesses during the during the first or second swelling prior to contact between the (pre-swollen) cellulose and the flavoring substances in step (III) the excess must be reduced to a suitable swelling agent proportion. This can take place for example by decanting or by analogy to the statements further above by centrifuging, pressing and/or drying with maintenance of the swollen state.

The replacement of the (included) swelling agent by flavoring substances in step (III) preferably takes place by mixing the pre-swollen cellulose (or the starting mixture ($M_{III}$)) with the flavoring substances. For the equipment to be used the same rules apply as for the swelling of the cellulose described above, i.e. a person skilled in the art decides on the basis of the state of the (pre-swollen) cellulose (solid, paste, liquid) on what equipment is suitable.

In a particularly preferred embodiment of the method according to the invention prior to the execution of step (III) the quantity of (included or non-included) swelling agent remaining from step (I) or step (II) or (IIb) is selected such that the starting mixture ($M_{III}$) has the appearance of a solid. Following addition of the flavoring substances the resulting mixture preferably likewise has the appearance of a solid. This advantageously ensures that the losses of flavoring substances in any subsequent step (IV), i.e. when removing the swelling agent not replaced by flavoring substances, is at all events low.

When executing in accordance with the invention in particular the particularly preferred embodiment described above the losses (ratio of flavoring substances used to encapsulated flavoring substances*100%) of the flavoring substances used is advantageously less than 50%, preferably less than 20% and particularly preferably less than 10%. In particularly preferred embodiments of the method according to the invention even flavoring losses of less than 1% can arise. Because of the preferred use of a starting mixture ($M_{III}$) as a solid the distribution of the flavoring substances in the cellulose largely takes place via the gas phase. It is therefore advantageous to seal the mixture of flavoring substance(s) and swollen cellulose (including included and non-included swelling agent) in a vessel. For a more rapid distribution the flavoring substances are preferably, by way of example, sprayed, dropped or poured onto the swollen cellulose. Additional mixing with using suitable equipment is also advantageous and therefore preferred according to the embodiment.

The mixing times when mixing the pre-swollen cellulose with the flavoring substances in step (III) are preferably, depending on the nature and purpose of the flavoring substances to be included and according to the mixing equipment and temperature, approximately 3 minutes to approximately 24 hours. The mixing times are preferably between approximately 3 minutes and one hour. The temperature during the mixing process is preferably between approximately 0 and 130° C., preferably between 10 and 60° C. and particularly preferably between 15 and 40° C. Our own investigations have shown that it is advantageous to increase the temperature in the initial stage and to lower this over time. Here the temperatures in the initial stage are by way of example between 40 and 100° C., preferably between 40 and 80° C. and particularly preferably between 40 and 60° C. The temperatures are then lowered over time to, for example, 0 to 39° C., preferably 10 to 39° C. and particularly preferably 15 to 30° C.

The removal of swelling agent not replaced by flavoring substances that takes place in a step (IV) described previously preferably takes place by circulating gas freely or around or through or in a vacuum. The removal of this swelling agent preferably takes place by circulating gas freely or around or through. Suitable gases are, by way of example, air, nitrogen, dinitrogen monoxide, and carbon dioxide as well as mixtures of these gases. These gases used for removal of swelling agent preferably have an optimum relative atmospheric humidity. The gases used preferably have a relative atmospheric humidity of 0 to 70%, preferably of 0 to 60% and particularly preferably of 0 to 50%. The temperature of the gases here is preferably approximately 0 to 100° C., preferably 0 to 40° C. and particularly preferably 0 to 25° C. The production of gases with a defined moisture content will be known to a person skilled in the art and can, for example, take place by mixing gases with different moisture contents, humidification of gases with water or steam or by condensation.

In the complete absence of primary swelling agent, in particular in the complete absence of water, e.g. with complete washing out or complete freeze-drying in combination with (virtually) anhydrous removal of any secondary swelling agent present (e.g. at approximately 0% atmospheric humidity; see above), there is the danger however, that the cellulose following inclusion of the flavoring substances does not sufficiently close up. This means that although the flavoring substances are in fact included, volatilization (even if delayed compared also with flavoring substances attaching to the surface of the cellulose) of included flavoring substances takes place. In order to convert such a flavoring substance-included cellulose into a more stable, i.e. better protected from volatilization of the included flavoring substances, form, our own investigations have shown that it is advantageous to apply a method according to the invention for producing a flavoring substance-included cellulose (as described above), wherein after the inclusion of the flavoring substances a quantity of water is added, which is below an effective swelling agent concentration, so that no increase in the distance between the cellulose chains of the flavoring substance-included cellulose takes place. The step is preferably carried out in a sealed container.

Accordingly a method according to the invention for producing a flavoring substance-included cellulose (as described above) also includes after step (III) or—where present—after step (IV) preferably the following step:

addition of water to the cellulose with included flavoring substances in a quantity so that the volatilization of flavoring substances included in the cellulose is reduced.

The appropriate quantity of water can be determined by a person skilled in the art without great effort taking into account the theory of the present text.

In the following further details of preferred embodiments according to the invention of the method described above for producing a flavoring substance-included cellulose are described.

The following explanations concern a preferred method according to the invention for producing a flavoring substance-included cellulose, comprising the steps (I), (II), (III) and (IV) defined and described above:

The use of this kind of method has proven to be particularly advantageous when using the primary swelling agent (A) water and the secondary swelling agents (B) ethanol or propanol.

The execution of this kind of method according to the invention is particularly advantageous and appropriate if the primary swelling agent (A) and the flavoring substances to be included are incompatible with one another, i.e. if they are not, or are hardly, soluble in one another, mixing is only possible with the formation of separate phases or undesired reactions of the primary swelling agent and the flavoring substances occur.

Swelling with one of the above-mentioned preferred primary swelling agents (A) takes place as described further above. After the first swelling in step (I) the total proportion of the (included and non-included) primary swelling agents (A) prior to replacement of the included swelling agents (A) in step (II) in a starting mixture ($M_{II}$), comprising cellulose, included and non-included swelling agent (A) and possibly hemicellulose and/or lignin, is preferably approximately 5 to 90 Wt %, preferably 10 to 60 Wt % and particularly preferably 20 to 50 Wt %, in relation to the total weight of cellulose, included and non-included primary swelling agent (A), hemicellulose and lignin in the starting mixture ($M_{II}$). Here it should be noted that the first swelling as a rule is reversible and the cellulose in particular when there is a reduction in the content of primary swelling agent (A) (i.e. below 20 Wt %, in particular below 15 Wt %) in the starting mixture (MII)) and longer storage can revert to the un-swollen state. With such low contents of primary swelling agent (A) the swollen state is still stable over a number of hours, however, so that the timeframe for further processing in the manner according to the invention can be adhered to without problems. Where the swollen cellulose is stored (between step (I) and (II)) for longer than approximately 12 to 24 hours, the swollen state can, however, change back to the un-swollen state and the production of the flavoring substance-included cellulose according to the invention is complicated or is no longer possible.

In the context of the present text, the term "starting mixture ($M_{II}$)" designates a mixture that exists at the start of the optional step (II) according to the invention (replacement of included primary swelling agents by secondary swelling agents) which contains cellulose (pre-swollen according to step (I) by primary swelling agent), included and possibly (residual quantities of) non-included primary swelling agent and additionally possibly hemicellulose and/or lignin.

Swollen celluloses with a high proportion of primary swelling agent (i.e. above 40 Wt %, preferably above 50 Wt % in the starting mixture ($M_{II}$)) as a rule can be stored for a long period, provided they are stored in a sealed container.

The replacement of the primary by the secondary swelling agent can take place once or repeatedly under the conditions mentioned further above. Repeated replacement, i.e. repetition of step (II) is as a rule necessary if in order to remove excess primary swelling agent quantities prior to step (II) no mechanical aids (e.g. press, centrifuge) are used. Then the preferred procedure is as follows: the starting mixture ($M_{II}$) has a large quantity of secondary swelling agent (B) added, so that a low viscosity liquid containing dispersed (pre-swollen) cellulose results. A mixing process as described above is carried out and then as much (non-included) swelling agent as possible is removed (gently, e.g. by decanting, filtering or drawing off via a drain). The addition of the secondary swelling agent (B), execution of the mixing process and removal of the swelling agents (primary and secondary) is repeated a total of approximately two to three times. There then follows step (III), i.e. the replacement of included swelling agents (here: mainly secondary swelling agents (B)) by flavoring substances.

Through the use of mechanical aids (e.g. presses, centrifuges) for the removal of excess primary swelling agents (A) advantageously a repeated treatment with the secondary swelling agent (B) is superfluous or the necessary quantity of secondary swelling agent (B) to be used is reduced, so that a single treatment with smaller quantities of secondary swelling agent (B) than without the help of the mechanical aids is possible. Where a single treatment with relatively small quantities of secondary swelling agent (B) is sufficient, in order to reduce the quantity of primary included swelling agent (A) to such an extent that the flavoring agent-included cellulose according to the invention can result, the content of primary swelling agent (A) in the starting mixture ($M_{II}$) should preferably be less than 60 Wt %, in relation to the total weight of cellulose, included and non-included primary swelling agent (A), hemicellulose and lignin in the starting mixture ($M_{II}$). The content of primary swelling agent (A) in the starting mixture ($M_{II}$) following the use of mechanical aids (as described above) is advantageously 40 to 50 Wt %. Without prior use of mechanical aids the content of primary swelling agent (A) in the starting mixture ($M_{II}$) is often between approximately 70 and 90 Wt %.

Apart from the use of mechanical aids the removal of excess primary swelling agents can also take place by drying. In the context of the present invention the term drying means the removal or reduction of swelling agents by vaporescence, evaporation or sublimation. The advantage of drying is that the content of primary swelling agent can be lowered a relatively long way, that is to say to a value of less than 20 Wt %, in particular less than 15 Wt % in relation to the total weight of cellulose, primary swelling agent and—where present—accompanying substances. The advantage here is that in particular when volatile primary swelling agents from group (a1) are used, including in particular water, only a small quantity of secondary swelling agent (B) is needed. Advantageously here the quantity of secondary swelling agent (B) is preferably selected to be lower than when mechanical aids are used, since here the secondary swelling agents from group (B) in many cases are no longer needed to reduce the proportion of primary swelling agent, but primarily serve (only) for preparation of the cellulose for inclusion of the flavoring substances. Here under certain drying conditions the surprising effect already described above can be taken advantage of so that once primary swelling has taken place, although the swelling agent content has already been reduced or lowered to a level at which the cellulose would actually (again) be present in the un-swollen state, at least for a short time it maintains the swollen state (quasi-swollen, activated state). The quantity of the secondary swelling agent (B) to be used is in this special case of execution preferably 0.5 kg to 2 kg/kg cellulose including any accompanying substances present.

Without (at least short term) maintenance of the swollen state during the execution of the drying as a function of the parameters applied a depletion of the cellulose takes place. The drying should therefore preferably be performed in a very controlled manner. Generally when using freeze-drying there is minimal tendency towards depletion of the (pre-swollen) cellulose. With other types of drying in order to maintain the swollen state of the cellulose a relatively low temperature, i.e. preferably less than 100° C., preferably less than 60° C. and particularly preferably less than 40° C. should preferably be used. Apart from this the individual cellulose fibers from a number of cellulose fibers should preferably dry as evenly as possible over time, in order to prevent depletion of the individual cellulose fibers. In this connection therefore fluid bed drying is particularly preferable. After drying rapid further processing is advantageous, since the quasi-swollen, activated state can only be maintained as a rule for a short time with the low content of primary swelling agent set by drying. Further details of this have already been described further above.

Where repeated treatment of the cellulose with secondary swelling agent (B) is to be avoided, in the context of the method according to the invention the process of percolation can be applied. The execution of and equipment for percolation will be known to a person skilled in the art, for example from the production of spice and herbal extracts for liquor production. During percolation within the meaning of the present invention the secondary swelling agent (B) slowly flows through a cellulose layer enriched with primary swelling agent (A) and removes the primary swelling agent (A) from the cellulose. The thickness of the cellulose layer here is preferably a few centimeters to a few meters. Because of the continuous execution of the percolation the repeated treatments with the secondary swelling agents (B) can advantageously be reduced to a single treatment, with comparable lower equipment requirements and lower consumption of swelling agent. For the temperature and the time during percolation the statements made further above apply.

Alternatively the treatment with the secondary swelling agent (B) preferably takes place by vaporization. For further information on vaporization see the statements further above. Advantages of vaporization are a low(er) consumption of swelling agent, continuous execution and an optimum residual swelling agent content in the starting mixture ($M_{III}$) for the following treatment with flavoring substances in step (III).

The following explanations concern a method as described above for producing a flavoring substance-included cellulose, comprising the steps (I), (II), (III) and (IV) defined above, wherein in step (I) apart from one or more primary swelling agents (A) additionally one or more secondary swelling agent(s) (B) is (are) used:

According to this embodiment the first swelling is carried out with a mixture of primary and secondary swelling agents. Advantageously in this variant is the parallel execution of the primary and secondary swelling, whereby the number of treatments necessary with the secondary swelling agent is reduced. As a rule it is sufficient, following the first swelling with the mixture of primary and secondary swelling agents to perform just a single swelling with the secondary swelling agent (B). The use of mechanical aids, such as presses or centrifuges, is in this case advantageously usually not absolutely necessary. Here the mixture of primary and secondary swelling agents preferably has a minimum content of primary swelling agent (A) of 25 Wt % in relation to the total weight the mixture. In this way a sufficient primary swelling is achieved. The mixture preferably comprises 25 to 99 Wt % of primary swelling agent (A) and 1 to 75 Wt % secondary swelling agent (B), particularly preferably 30 to 60 Wt % a primary swelling agent (A) and 40 to 70 Wt % secondary swelling agent (B), in each case in relation to the total weight of the mixture.

The application of a mixture of primary and secondary swelling agents in step (I) has in particular proven itself for the primary swelling agent (A) water in combination with the secondary swelling agent (B) ethanol or propanol. Further preferred combinations are, for example, the primary swelling agent (A) acetic acid (glacial acetic acid) in combination with the secondary swelling agent (B) ethanol or propanol as well as mixtures of water, acetic acid and ethanol or water, acetic acid and propanol.

The following explanations concern a method as described above for producing a flavoring substance-included cellulose, comprising the steps (I), (III) and (IV) defined above, wherein the method does not contain a step (II) as defined above and the primary swelling agent (A) is preferably selected from group (a2):

According to this preferred embodiment of the method according to the invention the cellulose is treated in step (I) with a primary swelling agent (A) from group (a2) and then treated directly with the flavoring substances to be included (step (III)). The particular advantage of this embodiment is the simplicity of the method. Mechanical aids or repeated treatments with one or more swelling agent(s) are not necessarily required. A primary swelling agent (A) from group (a2) is on the one hand able to release the hydrogen bridge bonds between the OH groups of the cellulose and on the other has very good solubility or miscibility with the flavoring substances to be included, i.e. combines well with the flavoring substances. Only very few substances meet the requirements of such a primary swelling agent. One example of such a substance is acetic acid (universal swelling agent).

With this method embodiment according to the invention it is extremely advantageous that the water content of the cellulose to be used is below 20 Wt %, in particular below 15 Wt % and during the method, i.e. up until inclusion of the flavoring substances, is kept below these values (that stated above concerning the water content applies here by analogy). Should higher water contents be present then there would be a danger of the water occupying the relevant bonding sites in the cellulose thereby impeding the inclusion of the flavoring substances.

Accordingly for the universal swelling agent applied according to this embodiment (primary swelling agent of group (a2)), it is also the case that this preferably—where it is present in a mixture with water—has only a very low water content, preferably of less than 10 Wt %, preferably less than 5 Wt % and particularly preferably less than or equal to 1 Wt %, so that the water content of the cellulose is not raised or only insignificantly so. In connection with the present invention it is generally the case that the universal and secondary swelling agent—where this is present in a mixture with water—preferably have only a low water content, preferably of less than 30 Wt %, preferably less than 10 Wt % and particularly preferably less than or equal to 1 Wt %.

The following explanations concern a further alternative embodiment of a method according to the invention for producing a flavoring substance-included cellulose.

According to this embodiment initially various swelling agents are reacted with one another, so that one or more further substance(s) result. For example, this embodiment is preferably carried out by treating cellulose with a primary swelling agent (A) and then adding a secondary swelling agent (B), so that the primary swelling agent (A) reacts with the secondary swelling agent (B) to form one or more additional substances (likewise swelling agent(s) within the meaning of the above definition). Here, however, it is also possible for one or more of these additional substance(s) to be a flavoring substance (e.g. propyl acetate) or flavoring substances.

Here it is advantageous if at least one, preferably all, of the substances resulting from the reaction has or have a lower boiling temperature than one or both of the converted swelling agent(s). An example of such a swelling agent consists of acetic acid (glacial acetic acid) as the primary swelling agent (A) and ethanol as the secondary swelling agent (B). Where these two swelling agents are processed at low temperatures (in the range 0 to approximately 50° C.), hardly any reaction or only a very slight reaction between the two swelling agents takes place. At high temperatures (above approximately 50° C.), preferably at a temperature in the range 80 to 120° C. acetic acid and ethanol react to form acetic acid ethyl ester and water. The boiling temperatures of the swelling agents are approximately 118° C. (acetic acid) and 78° C. (ethanol). The boiling temperatures of the reaction products are 100° C. (water) and 77° C. (acetic acid ethyl ester). The conversion therefore leads to products which in each case are more volatile than at least one of the actual swelling agents used. The proportion of water that results can in this embodiment be easily controlled via the quantity of starting materials used, such that the proportion of water in relation to the total weight of water, cellulose and—where present—accompanying substances is below 20 Wt %, in particular below 15 Wt % and thus later in the process (i.e. when the flavoring substances are included) does not impede the formation of the flavoring substance-included celluloses according to the invention. The danger of the embedding of the flavoring substances being impeded by an excessive content of primary swelling agent has already been described further above. Following partial replacement of the products or the newly formed swelling agent by the flavoring substances to be included in step (III) the newly formed non-included swelling agents can advantageously be removed in step (IV) particularly easily by treatment with freely circulating gases. As a result of this losses of particularly volatile included flavoring substances are reduced.

According to the method explained above for producing a flavoring substance-included cellulose the present invention concerns in particular a flavoring substance-included cellulose (as described above) or a mixture (as described above), wherein the flavoring substance-included cellulose or the mixture can be produced by a method according to the invention (as described above).

A further aspect of the present invention concerns the use of a flavoring substance-included cellulose according to the invention, preferably a flavoring substance-included cellulose (as described above) designated above as preferred, or a mixture according to the invention, preferably a mixture (as described above) designated above as preferred, for the flavoring of a preparation or semi-finished products for nourishment or pleasure.

The present invention also concerns a preparation or semi-finished product for nourishment or pleasure, comprising a preferably sensorially active quantity of a flavoring substance-included cellulose according to the invention, preferably a flavoring substance-included cellulose (as described above) designated above as preferred or a mixture according to the invention, preferably a mixture (as described above) designated above as preferred.

Preference is for a preparation or semi-finished product for nourishment or pleasure as described above, wherein the total proportion of flavoring substance-included cellulose in relation to the total weight of the preparation or semi-finished product is in the range 0.001 to 10 Wt %, especially in the range 0.25 to 5 Wt %, particularly preferably in the range 0.5 to 3 Wt %.

Preparations or semi-finished products according to the invention for nourishment or pleasure are preferably chosen from the group comprising:

bakery products (for example bread, dry biscuits, cakes, muffins, waffles, baking mixes, other pastry products), confectionery (for example white, milk or dark chocolates, filled chocolates (for example filled with aromatized fondant mass of the After Eight type), chocolate bars, other bar products, chewing candies, fruit gums, hard-boiled and soft candies, chewing gum, sugar pearls, lollipops), capsules (preferably seamless capsules for direct consumption, preferably with a shell based on gelatin and/or alginate), fat masses (for example fillings for baked goods such as for example biscuit fillings, fatty chocolate fillings, fatty chocolate bar fillings), toppings, alcoholic or non-alcoholic beverages (for example coffee, tea, wine, wine-based beverages, beer, beer-based beverages, liqueurs, spirits, brandies, fruit-based carbonated beverages, isotonic beverages, soft drinks, nectars, fruit and vegetable juices, fruit or vegetable juice preparations), instant beverages or instant powders (for example instant cocoa beverages, instant tea beverages, instant coffee beverages, instant desserts in powder form such as custard powder or jelly), meat products (for example ham, fresh or cured sausage preparations, spiced or marinated fresh or cured meat products), eggs or egg products (for example dried egg powder), cereal products and/or nut products (for example breakfast cereals, cornflakes, oat flakes, muesli, muesli bars, trail mix, sweet popcorn, nut bars, fruit and nut bars, precooked ready rice products), dairy products (for example milk beverages, milk ice cream, yoghurt, custard, kefir, curd cheese, soft cheese, hard cheese, dried milk powder, whey, butter, buttermilk, products containing partially or entirely hydrolyzed milk protein), products made from Soya protein or other Soya bean fractions (for example Soya milk and products produced therefrom, preparations containing Soya lecithin, fermented products such as tofu or tempeh or products produced therefrom, Soya sauces), fruit preparations (for example jams, fruit ice cream, fruit sauces, fruit fillings), vegetable preparations (for example ketchup, sauces, dried vegetables, deep-frozen vegetables, precooked vegetables, pickled vegetables, preserved vegetables), snack articles (for example baked or fried potato chips or potato dough products, bread dough products, maize- or peanut-based extrudates), fat- and oil-based products or corresponding emulsions (for example mayonnaise, remoulade, dressings, seasoning preparations), other ready-to-serve meals and soups (for example dried soups, instant soups, precooked soups), spices, seasoning mixtures and in particular powdered seasonings, which are for example used in snack food applications Preparations or semi-finished products according to the invention for nourishment or pleasure may also be nutritional supplements in the form of capsules, tablets (uncoated and coated tablets, for example coatings resistant to gastric juices), sugar-coated tablets, granules, pellets, mixtures of solids, dispersions in liquid phases, as emulsions, as powders, as solutions, as pastes or as other swallowable or chewable preparations.

Preferred preparations or semi-finished products for nourishment or pleasure are preferably selected from the group comprising:

confectionery such as for example hard candies, chewing gums, fruit gums, chewable candies, sugar-coated (refreshing) lozenges, compressed lozenges, hard caramels, chocolate spreads, candies and chocolate, bakery products such as cakes, wafers and cookies, snacks, instant meals and other instant products (soups, sauces, beverage powders and granules, seasoning mixtures), ice cream, fruit preparations, (marmalades, jams, fruit sauces), desserts (blancmange, jelly), dairy products (quark, yoghurt, milk drinks, whey preparations) and cereals (cornflakes, muesli bars). In addition, use is also advantageous in nutritional supplements and pharmaceutical products, such as suckable tablets, throat or cough drops, pharmaceutical powders, tablets or granules.

The snacks according to the invention preferably comprise salty snacks, such as for example potato/corn chips, extrudates, pellets, popcorn, crackers, lye rolls and fried or oven-baked dough products. Flavoring substance-included cellulose according to the invention or an aroma composition comprising flavoring substance-included cellulose according to the invention may be incorporated into a snack article or applied thereto. Incorporation or application may be achieved by means of powdered seasoning, sprayed-on oil slurry, fatty fillings or dough aromatization.

Further constituents which may be used for preparations or semi-finished products according to the invention serving for nutrition or pleasure are conventional basic and auxiliary substances and additives for foodstuffs or products consumed for pleasure, for example water, mixtures of fresh or processed, plant or animal basic or raw materials (for example raw, roasted, dried, fermented, smoked and/or boiled meat, bone, cartilage, fish, vegetables, fruit, herbs, nuts, vegetable or fruit juices or pastes or mixtures thereof), digestible or indigestible carbohydrates (for example amylose, amylopectin, inulin, xylans, cellulose (not according to the invention)), natural or hardened fats (for example tallow, lard, palm fat, coconut oil, hardened vegetable fat), oils (for example sunflower oil, peanut oil, corn germ oil, olive oil, fish oil, soy oil, sesame oil), fatty acids or the salts thereof (for example potassium stearate), proteinogenic or non-proteinogenic amino acids and related compounds (for example γ-aminobutyric acid, taurine), peptides (for example glutathione), native or processed proteins (for example gelatin), enzymes (for example peptidases), nucleic acids, nucleotides, taste-correcting agents for unpleasant taste impressions, further taste modulators for further, generally not unpleasant taste impressions, other taste-modulating substances (for example inositol phosphate, nucleotides such as guanosine monophosphate, adenosine monophosphate or other substances such as sodium glutamate or 2-phenoxypropionic acid), emulsifiers (for example lecithins, diacylglycerols, gum Arabic), stabilizers (for example carageenan, alginate), preservatives (for example benzoic acid, sorbic acid), antioxidants (for example tocopherol, ascorbic acid), chelating agents (for example citric acid), organic or inorganic acidulants (for example malic acid, acetic acid, citric acid, tartaric acid, phosphoric acid), bitter substances (for example quinine, caffeine, limonin, amarogentin, humolone, lupolone, catechins, tannins), mineral salts (for example sodium chloride, potassium chloride, magnesium chloride, sodium phosphates), substances preventing enzymatic browning (for example sulfite, ascorbic acid), essential oils, plant extracts, natural or synthetic dyes or coloring pigments (for example carotenoids, flavonoids, anthocyans, chlorophyll and the derivatives thereof), spices, trigeminally active substances or plant extracts containing such trigeminally active substances, cooling active ingredients such as for example menthol, menthol derivatives (for example L-menthol, L-menthyl lactate, L-menthyl glutarate, L-menthyl succinate) or cubebol, synthetic, natural or nature-identical aroma substances or odoriferous substances and odor-correcting agents.

Preparations or semi-finished products according to the invention serving for nutrition or pleasure preferably additionally contain one or more taste-correcting agents, preferably selected from the following list: nucleotides (for example adenosine 5'-monophosphate, cytidine 5'-monophosphate,) or the pharmaceutically acceptable salts thereof, lactisole, sodium salts (for example sodium chloride, sodium lactate, sodium citrate, sodium acetate, sodium gluconate), further hydroxyflavanones (for example eriodictyol, homoeriodictyol or the sodium salts thereof), in particular according to US 2002/0188019, hydroxybenzoic acid amides according to DE 10 2004 041 496 (for example 2,4-dihydroxybenzoic acid vanillylamide, 2,4-dihydroxybenzoic acid N-(4-hydroxy-3-methoxybenzyl)amide, 2,4,6-trihydroxybenzoic acid N-(4-hydroxy-3-methoxybenzyl)amide, 2-hydroxybenzoic acid N-4-(hydroxy-3-methoxybenzyl)amide, 4-hydroxybenzoic acid N-(4-hydroxy-3-methoxybenzyl)amide, 2,4-dihydroxybenzoic acid N-(4-hydroxy-3-methoxybenzyl)amide monosodium salt, 2,4-dihydroxybenzoic acid N-2-(4-hydroxy-3-methoxyphenyl)ethylamide, 2,4-dihydroxybenzoic acid N-(4-hydroxy-3-ethoxybenzyl)amide, 2,4-dihydroxybenzoic acid N-(3,4-dihydroxybenzyl)amide and 2-hydroxy-5-methoxy-N-[2-(4-hydroxy-3-methoxyphenyl)ethyl]amide (aduncamide), 4-hydroxybenzoic acid vanillylamide), bitterness-masking hydroxydeoxybenzoins according to WO 2006/106023 and the documents based thereon (Symrise) (for example 2-(4-hydroxy-3-methoxyphenyl)-1-(2,4,6-trihydroxyphenyl)ethanone, 1-(2,4-dihydroxyphenyl)-2-(4-hydroxy-3-methoxyphenyl)ethanone, 1-(2-hydroxy-4-methoxyphenyl)-2-(4-hydroxy-3-methoxyphenyl)ethanone), amino acids (for example gamma-aminobutyric acid according to WO 2005/096841 for reducing or masking an unpleasant taste impression such as bitterness), malic acid glycosides according to WO 2006/003107, salty tasting mixtures according to WO 2007/045566, diacetyl trimers according to WO 2006/058893, divanillin, mixtures of whey proteins with lecithins and/or bitterness-masking substances such as gingerdione according to WO 2007/003527.

Preparations or semi-finished products according to the invention serving for nutrition or pleasure may additionally contain one or more alkamides, preferably selected from the group consisting of: 2E,4E-decadienoic acid N-isobutylamide (pellitorine), 2E,4Z-decadienoic acid N-isobutylamide (cis-pellitorine), 2Z,4Z-decadienoic acid N-isobutylamide, 2Z,4E-decadienoic acid N-isobutylamide, 2E,4E-decadienoic acid N-([2S]-2-methylbutyl)amide, 2E,4E-decadienoic acid N-([2S]-2-methylbutyl)amide, 2E,4E-decadienoic acid N-([2R]-2-methylbutylamide), 2E,4Z-decadienoic acid N-(2-methylbutyl)amide, 2E,4E-decadienoic acid N-piperide (achilleamide), 2E,4E-decadienoic acid N-piperide (sarmentine), 2E-decenoic acid N-isobutylamide, 3E-decenoic acid N-isobutylamide, 3E-nonenoic acid N-isobutylamide, 2E,6Z,8E-decatrienoic acid N-isobutylamide (spilanthol), 2E,6Z,8E-decatrienoic acid N-([2S]-2-methylbutyl)amide (homospilanthol), 2E,6Z,8E-decatrienoic acid N-([2R]-2-methylbutyl)amide, 2E-decen-4-ynoic acid N-isobutylamide, 2Z-decen-4-ynoic acid N-isobutylamide, sanshool.

Flavoring substance-included cellulose according to the invention or flavoring substance-included cellulose produced by a method according to the invention can for example be demonstrated on the basis of the iodine binding capacity of cellulose and by NMR and X-ray diffraction spectroscopy.

Because of the predominant use of liquid flavoring substances the principle described in the following can in particular be applied. Liquid flavoring substances (flavoring substances, that are not applied to a carrier) generate in the liquid echo NMR experiment in the time domain a signal with a starting signal amplitude at time t=0 of A1 (t=0), wherein A1 (t=0) is greater than 0. Where the flavoring substances used in each case are present in a manner not in accordance with the invention in association with cellulose, for example as a simple mixture of flavoring substances and cellulose (which when looked at with the human eye may indeed appear to be a solid), the signal from the flavoring substances is detected in the liquid echo NMR experiment. Here A1 (t=0) for the liquid flavoring substances and A2 (t=0) for a corresponding flavoring substance-cellulose mixture not according to the invention correspond to the greatest extent on condition that equivalent flavoring substance quantities are used. In flavoring substance-included celluloses according to the invention, on the other hand, the included flavoring substances in the context of the liquid echo NMR experiment in the time domain are not detected as a fluid, but behave like a solid, i.e. they generate under comparable measurement conditions no signal intensity. A2 (t=0) is thus 0.

The principle described above can also be applied in connection with common solid flavoring substances, by using in the NMR measurement a defined temperature above the melting point of the flavoring substances.

In order to determine the total flavoring substance content X (i.e. the content of included and non-included flavoring substances) of a sample with flavoring substance-included cellulose according to the invention in particular distillative and extractive sample reconditionings or combinations of these can be used. In particular the sample reconditioning takes place by simultaneous distillation and extraction (SDE), the execution of which will be known to a person skilled in the art. Here it should be ensured that the production of the flavoring substances is exhaustive, for which reason the reconditioning should last at least 4 hours. The quantification can take place by gas chromatography.

The included flavoring substance content I (i.e. the content of included flavoring substances) of a sample with a flavoring substance-cellulose mixture or with a flavoring substance-included cellulose (according to the invention) can be calculated from:

$$I = X * \left(1 - \frac{A2(t=0)}{A1(t=0)}\right)$$

where
I=included flavoring substance content
X=total flavoring substance content=mass of flavoring substances/(mass of flavoring substances+mass of cellulose)
and
A2 (t=0)=starting amplitude at time t=0 of the flavoring substance sample of the flavoring-cellulose sample or of the flavoring substance-included cellulose sample
A1 (t=0)=starting amplitude at time t=0 of the flavoring substances without cellulose, wherein the flavoring substance quantity corresponds to the flavoring substance quantity from the flavoring substance-cellulose sample or the flavoring substance-included cellulose sample.

The normal procedure in the determination of A1 (t=0) and A2 (t=0) is that from a flavoring substance cellulose sample or flavoring substance-included cellulose sample to be investigated the total flavoring substance content X is determined. A1 (t=0) and A2 (t=0) are determined with a NMR device, e.g. the Minispec mq 20 from Bruker. Initially a determination is made of how much weight of flavoring substance sample or flavoring substance-included cellulose sample, $m_{(sample)}$ fits into a sample tube. This varies according to the bulk density of the sample and is normally 1 to 2 g. Using the mass $m_{(sample)}$ with the help of the total flavoring substance content X the mass of the flavoring substances contained therein $m_{(flavoring\ substance)}$ is calculated. An equivalent quantity of these flavoring substances (without cellulose) with a mass of $m_{(flavoring\ substance)}$ is weighed in a separate sample tube and placed in the sample shaft of the NMR device. As an NMR experiment a 90° pulse, followed by 180° pulses each at 1.5 ms intervals is selected (liquid echo). The evaluations take place in the time domains. The starting amplitude is determined by means of a biexponential regression. The gain of the device is adapted such that A1 (t=0) of the flavoring substance sample is approximately 75+/−10% of the maximum value of the signal intensity that can be displayed. The gain set in this way is maintained for determination of A1 (t=0) and A2 (t=0). Following determination of A1 (t=0), A2 (t=0) of the mass $m_{(sample)}$ of the flavoring substance-cellulose sample or the flavoring substance-included cellulose sample is determined. It is particularly important that the flavoring substances (without cellulose) and the flavoring substance-cellulose sample or the flavoring substance-included cellulose sample have the same temperature.

According to the invention the included flavoring substance content I particularly preferably corresponds to the total flavoring substance content X. In this case the quotient of I and X I/X=1. Furthermore it is also possible and depending on the application possibly also preferred, to produce a flavoring substance-included cellulose in the form of a mixture (an aggregate) in which the flavoring substance(s) included according to the invention and in other ways, in particular flavoring substances attached to the surface of the cellulose, are contained. Such flavoring substance-included cellulose forms result in particular if the production according to the invention is performed with excesses of flavoring substances and the often more volatile swelling agents have already been vaporized, while the often somewhat less volatile flavoring substances remain on the surface of the cellulose, wherein additional flavoring substances are included in the cellulose. In these cases I/X is between approximately 0.1 and 0.999 and preferably between 0.5 and 0.999.

Accordingly the present invention also concerns a mixture, comprising or consisting of flavoring substance-included cellulose according to the invention preferably designated above as preferred and non-included flavoring substances, which are materially identical to the included flavoring substances, wherein the non-included flavoring substances are partially attached to the surface of the flavoring substance-included cellulose. For preferred embodiments of such a mixture according to the invention and its components that stated further above applies by analogy.

Mixtures according to the invention (as described above) can of course contain further flavoring substances (i.e. flavoring substances, which differ materially from the included flavoring substances). As a result in a mixture according to the invention flavoring substances can be advantageously specifically combined with flavoring substance-included celluloses according to the invention, in order to obtain a desired overall flavor impression, which could not be achieved by the flavoring substance-included celluloses according to the invention on their own. In particular such a mixture can contain as further flavoring substances advantageously also flavoring substances which are not suitable or preferred for inclusion in cellulose.

According to that stated above the present invention also concerns a mixture comprising or consisting of
(i+ii) flavoring substance-included cellulose according to the invention, preferably designated above as preferred and
(iii) possibly accompanying substances,
(iv) possibly water and
(v) flavoring substances not included in cellulose.

The flavoring substances (v) not included in cellulose here include—in each case where present—both flavoring substances, which in the context of the method according to the invention are used for inclusion in cellulose, but which here (despite generally having the ability to be included) have not been included, i.e. therefore also flavoring substances, which are materially identical to the included flavoring substances, and also flavoring substances, which are added as further, i.e. not for inclusion flavoring substances to the flavoring substance-included celluloses according to the invention, wherein the further flavoring substances differ materially from the included flavoring substances. In particular therefore flavoring substances may be contained as flavoring substances not included in cellulose which are not lipophilic.

For the selection of preferred components of such a mixture that stated above applies by analogy. Particular preference is for such a mixture, wherein the proportion of (i+ii) flavoring substance-included cellulose according to the invention including (iii) any accompanying substances present and (iv) any water that is present is 50 to 99.9 Wt %, preferably 75 to 99.9 Wt %, in relation to the total weight of the mixture. Particular preference here is for the proportion of the (v) flavoring substances not included in cellulose to be 0.1 to 50 Wt %, more preferably 0.1 to 25 Wt %, in relation to the total weight of the mixture.

In the following the invention is explained in more detail with the use of examples. Unless otherwise stated the percentages given are mass percentages.

EXAMPLES

Example 1

10 g of cellulose (oat fiber HF 600-30 from Rettenmaier of Rosenberg; water content 9%) have 100 g water added, and then the mixture is heated until boiling and allowed to simmer for one hour (first swelling). After 30 minutes' standing time excess water is decanted off and 100 g ethanol (purity >99.9%) are added. The mixture is heated until boiling, covered and allowed to simmer for 45 minutes (second swelling). After 30 minutes' standing time excess water-ethanol mixture is decanted off. The treatment with ethanol is carried out a total of three times. After the final decanting 10 g of d-limonene are added and stirring with a magnetic stirrer is performed for 30 minutes at a temperature of 25° C. (replacement of included swelling agents by flavoring agent).

The treated cellulose is filled into a three-necked flask. The middle neck is sealed. Through one neck dry air with a relative humidity of 0.1% and a temperature of 20° C. is passed into the flask and then drawn off via the open neck. After a period of approximately 24 hours the removal of the ethanol and excess limonene is complete and the flask is sealed. The limonene-cellulose complex (flavoring substance inclusion complex according to the invention) in relation to the total weight of the limonene-cellulose complex has a limonene content of 6.2%.

The flavor content details in these examples in each case relate to the included flavoring substance content.

Example 2

10 g of cellulose from example 1 have a mixture of 30 g water and 70 g Ethanol (purity >99.9%) added. The mixture is allowed to simmer for an hour. The cellulose is allowed to sediment and excess water-ethanol mixture is decanted off. 100 g of ethanol are added and the mixture is boiled for 45 minutes. Following filtration through a cotton cloth the cellulose is wrung out. The residual content of the swelling agent in the cellulose-swelling agent mixture is 64%. 10 g of d-limonene are added and using a spatula distributed in the cellulose that has been wrung out. The mixture is filled into a three-necked flask and this is completely sealed for a period of 30 minutes. Then for 24 hours dry air with a temperature of 20° C. is passed through the flask. The limonene-cellulose complex has a limonene content of 10.1%.

Example 3

Example 2 is repeated, wherein the removal of the swelling agent instead of by filtration takes place by spreading the cellulose on a tablet in the ambient air for 24 hours at 20° C. and a relative air humidity of 29%. The limonene-cellulose complex has a limonene content of 5.1%.

Example 4

Comparative Example 10 g of cellulose from example 1 have 100 g water added, the mixture is heated to boiling and then allowed to simmer for one hour. After 30 minutes' standing time the excess water is decanted off and 10 g of d-limonene are added. The mixture of swollen cellulose, water and d-limonene is stirred for 30 minutes with a magnetic stirrer at a temperature of 25° C. The mixture is spread on a tablet and dried for 24 hours in ambient air at a temperature of 20° C. and a relative air humidity of 29%. The limonene content of the cellulose is <0.01%. The limonene was not included in the cellulose. No limonene-cellulose complex according to the invention resulted.

Example 5

10 g of cellulose from example 1 have 30 g water and 70 g ethanol added and the mixture is allowed to simmer for one hour. The excess swelling agent mixture is pressed out (the swelling agent content of the mixture after pressing is 50%) and boiling takes place again with 100 g ethanol. Excess swelling agent is pressed out (the swelling agent content of the mixture after pressing is 50%) and 1 g d-limonene is added. The limonene is distributed in the pre-treated cellulose with a spatula and the mixture (which has the appearance of a solid) is stored in a sealed three-necked flask for one hour at 20° C. Then the remaining swelling agent is removed with dry air in the same way as in example 2. The limonene loading of the limonene-cellulose complex according to the invention is 8.2%. The limonene losses are just 10%, i.e. 90% of the limonene used was able to be included in the cellulose.

Example 6

Example 5 is repeated, wherein the swelling agent after the second ethanol treatment is not pressed out but simply decanted off. Following the addition of one gram of d-limonene a stirrable (liquid) mass results, which is stirred for one hour with a magnetic stirrer at 20° C. Following removal of the swelling agent in the same way as in example 5 the limonene loading of the limonene-cellulose complex according to the invention is 1.9%. A comparison between examples 5 and 6 demonstrates the advantages of a significant reduction in the quantity of swelling agent prior to treatment with the flavoring substance d-limonene.

Example 7

Example 5 is repeated, wherein instead of the d-limonene geraniol is used. The geraniol loading of the geraniol-cellulose complex is 8.9%. The losses are just 1%.

Example 8

10 g of cellulose powder (Vitacel (R) L101 from Rettenmaier of Rosenberg) are boiled in 100 g water for one hour. Excess water is then decanted off. In a percolation vessel the residual water remaining in the cellulose is then percolated by percolation with 100 ml of ethanol at 70° C. over a period of one hour. The cellulose has one gram of d-limonene added and the swelling agents are removed as in example 1.

Example 9

A cotton cloth is spread across the opening of a glass beaker filled with a small amount of water. 10 g of cellulose powder from example 8 are placed on the cotton cloth and vaporized for 30 minutes over the boiling water. Through this treatment the cellulose powder has absorbed 9.7 g of water. The cotton cloth including the pre-swollen cellulose is spread over a glass beaker with ethanol and vaporized for 60 minutes over the boiling ethanol. 1 g of orange oil is added and distributed with a spatula in the pre-treated cellulose. The mixture (solid) is placed in a three-necked flask, and the swelling agents are removed as stated in example 1. The content of included orange oil is 5.3%.

Example 10

10 g of cellulose from example 1 and 5 g water are heated in a closed, sealed vessel at 120° C. for one hour. The mixture is cooled to 20° C. 100 g of ethanol are added and the mixture is allowed to simmer for 30 minutes. The excess swelling agents are pressed off. The cellulose (with included and adhering swelling agent) is placed in a three-necked flask and dried with dry air (relative humidity 0.1%) to a total swelling agent content of 20%. 1 g of lemon flavoring is added and the three-necked flask is closed. After a standing time of one hour the removal of the swelling agent residue is continued.

Example 11

10 g of cellulose and 15 g of acetic acid are heated in a closed, sealed container at 120° C. for 2 hours and cooled to 30° C. Geraniol is added and the mixture is then treated at 25° C. with dry air.

Example 12

10 g of cellulose and 15 g acetic acid are heated in a closed, sealed vessel at 120° C. for 60 minutes. After cooling to 40° C., 50 g of ethanol are added and the closed preparation is reacted at 100° C. for 30 minutes. The cellulose, smelling of acetic acid ethyl ester, has a mixture of 0.5 g limonene and 0.5 g added and is then treated with dry air.

Example 13

10 g of cellulose are swollen at 25° C. for 24 hours in 50 g acetic acid. The excess acetic acid (glacial acetic acid) is decanted off and 100 g of ethanol are added. After a standing time of one hour at ambient temperature the supernatant liquid is removed and the cellulose is pressed until there is a swelling agent residual content of 45% in the cellulose-swelling agent mixture. In the same way as in example 2, limonene is added and the swelling agent removed.

Example 14

Example 2 is repeated, wherein instead of the cellulose used there a microcristalline cellulose is used.

Example 15

Example 8 is repeated, wherein instead of the limonene a strawberry flavoring is used.

Example 16

Example 9 is repeated, wherein instead of the orange oil a coffee flavoring is used.

Example 17

Example 10 is repeated, wherein instead of the lemon flavoring a vanilla flavoring is used.

Example 18

Example 11 is repeated, wherein instead of the geraniol a beef flavoring is used.

Example 19

Example 12 is repeated, wherein instead of the limonene a rum flavoring is used.

Example 20

10 g of cellulose from example 1 are treated for 3 hours with 100 ml of a 1% hydrochloric acid solution at 80° C. The cellulose is washed with water until a neutral pH is achieved. After pressing (residual water content 46%) the pre-treated cellulose is boiled for 30 minutes in 100 ml ethanol. The remaining swelling agents (water and ethanol) are pressed out (residual swelling agent content 46%), 1 g hazel nut flavoring is added and the mixture is brought to temperature in the closed three-necked flask for 20 minutes at 60° C. The mixture is cooled to 20° C. and the included swelling agents are removed with dry air.

Example 21

Comparative Example 10 g of cellulose from example 1 (oat fibers HF600-30, water content 9%) have 100 g ethanol added, the mixture is heated to boiling and allowed to simmer for one hour. After a standing time of 30 minutes the excess ethanol is decanted off and 10 g of d-limonene are added. The mixture of swollen cellulose, ethanol and d-limonene is stirred for 30 minutes with a magnetic stirrer at a temperature of 25° C. The mixture is spread on a tablet and dried for 24 hours in ambient air at a temperature of 20° C. and a relative air humidity of 29%. The limonene content of the cellulose is just 0.1%. The limonene was not included in the cellulose.

Example 22

10 g of oat fiber from example 1 are boiled for 10 minutes in 90 g of a 20%, aqueous sodium hydroxide solution. 37% hydrochloric acid is added in drops, until precipitation of the dissolved fractions can be observed. An additional 2 ml of hydrochloric acid are added to bring the pH to 0.5. The fibers are filtered off, washed with water until they have a neutral pH and pressed until the residual water content is 50%. They are then boiled twice with 100 g of ethanol on each occasion and 10 g of d-limonene are added to the mixture. The mass is spread over a tablet and dried at 25° C. and a relative air humidity of 37%. The limonene content of the limonene complex according to the invention is 8.2%.

Example 23

The limonene-cellulose complex according to the invention from example 22 is stored for 24 hours in an open glass beaker at 100° C. in the circulating air drying cabinet. The limonene content is reduced by the temperature treatment from 8.2% to 7.6%. This represents a loss of just 9%. As a comparison the test is performed with a simple mixture not according to the invention of limonene and cellulose (limonene is added to dried cellulose and mixed for 30 minutes). Following temperature treatment limonene can no longer be detected in the mixture. The limonene losses are 100%. The storage of stability flavoring substances included in cellulose according to the invention was thus able to be significantly increased.

Example 24

10 g of oat fibers from example 1 are boiled for 10 minutes in 90 g of a 20%, aqueous sodium hydroxide solution. The fibers are filtered off, washed with water until a neutral pH is achieved and pressed until there is a residual water content of 50%. They are then boiled twice with 100 g of ethanol on each occasion and pressed and 10 g of d-limonene are added to the mixture. The mass is dried at 0% relative air humidity. The limonene content is 6.9%.

Example 25

10 g of oat fibers from example 1 are boiled for 10 minutes in 90 g of a 20%, aqueous sodium hydroxide solution. 37% hydrochloric acid is added in drops, until precipitation of the dissolved fractions can be observed. An additional 2 ml of hydrochloric acid are added to bring the pH to 0.5. The fibers are filtered off, washed with water until they have a neutral pH and pressed until the residual water content is 50%. They are then boiled three times with 100 g of ethanol on each occasion and 10 g of d-limonene are added to the mixture. The mass is dried at a relative air humidity of 0%. The limonene content of the limonene-cellulose complexes according to the invention is 22.6%.

Example 26

Specimens from examples 8, 14 and 22 (i.e. samples of the flavoring substance-included celluloses according to the invention) are stored in a closed vessel in the laboratory. A tasting of the samples demonstrated sensorial accuracy, i.e. the oxidation of the limonene was prevented. Similarly produced, spray-dried samples (limonene in the carrier system gum Arabic and maltodextrin) demonstrate significant wrong notes, i.e. the limonene has oxidized. The flavoring substance-included celluloses according to the invention were markedly superior to the spray-dried products in terms of oxidation stability.

Example 27

10 g of microcrystalline cellulose (Vivapur (R) 101 from Rettenmaier of Rosenberg) are boiled for 60 minutes in 50 g water. The water content is reduced to 35% by pressing. The cellulose is pressed in a horizontally-positioned glass tube. A dry current of air is enriched in a gas washing bottle with dried ethanol and passed through the tube with the cellulose. The open end of the tube is closed off in such a way that the air current can still directly escape. The (included) water is now replaced by ethanol. After 24 hours of treatment time the treated cellulose has 1 g of coffee flavoring added and is stored for 30 minutes in a closed vessel. The ethanol (that has not been replaced by flavoring substances) is removed with the help of a dry current of air, wherein the coffee flavoring is included in the cellulose.

Example 28

10 g of cellulose powder are boiled for 30 minutes in 80 ml of water. The water is pressed off (water content of the cellulose following pressing: 45%). The cellulose is filled into a horizontally positioned glass tube and then the glass tube is brought to a slightly off-horizontal position, so that a slight incline results. Anhydrous ethanol is heated in a flask until simmering. The vapors are channeled into the glass tube with the cellulose, where they partially as condensate and partially in gas form replace and wick away the water in the cellulose. After one hour of treatment time the cellulose has a roast flavor added and the ethanol (not replaced by flavoring substances) is removed in a vacuum.

Example 29

Example 24 is repeated, wherein instead of the d-limonene an onion flavoring is used.

Example 30

Example 25 is repeated, wherein instead of the 10 g d-limonene 2 g of flavoring are used.

Example 31

Example 28 is repeated, wherein instead of the roast flavoring a tomato flavoring is used.

Example 32

Example 8 is repeated, wherein instead of the d-limonene a cream flavoring is used.

Example 33

Comparative Example 10 g of cellulose from example 1 are mixed with 10 g d-limonene. This simple mixture is filled into the three-necked flask described in example 1 and further treated in the same way as in example 1, i.e. the middle neck is closed. Through one neck dry air with 0% relative humidity and a temperature of 20° C. is introduced into the flask and via the other, open neck, it is drawn off. After approximately 24 hours the limonene content of the cellulose is determined. It is less than 0.01%. This example once again illustrates how a flavoring substance-included cellulose does not result from the simple mixing of flavoring substances and cellulose (not pre-swollen according to the invention).

Example 34

The example demonstrates the application of the analytical procedure described above for determination of the total flavoring substance content X by SDE and GC quantification as well as for determination of the included flavoring substance content I using NMR.

| | Total flavoring substance content | Included flavoring substance content I |
|---|---|---|
| limonene-cellulose complex according to the invention according to example 1 | 6.2% | 6.2% |
| limonene-cellulose complex according to the invention according to example 2 | 10.1% | 10.1% |
| geraniol-cellulose complex according to the invention according to example 7 | 8.9% | 8.9% |
| limonene-cellulose complex according to the invention according to example 25 | 22.6% | 22.6% |
| Comparison: simple mixture of limonene and cellulose* | 10.1% | 0.0% |
| Comparison: simple mixture of geraniol and cellulose* | 8.9% | 0.0% |

*The production takes place by mixing the respective flavoring substances and the cellulose with a spatula. Unlike in example 33 the mixture is not treated further, but is immediately analyzed.

Application Examples

Example F1

Chewing Gum with Flavoring Substance-Included Cellulose According to the Invention The chewing gum base K2 consists of 28.5% terpene resin, 33.9% polyvinyl acetate (MW=14,000), 16.25% hydrogenated vegetable oil, 5.5% mono- and diglyceride, 0.5% polyisobutene (MW 75,000), 2.0% butyl rubber (isobutene-isoprene copolymer), 4.6% amorphous silicon dioxide (water content approximately 2.5%), 0.05% antioxidant tert.-butyl-hydroxytoluol (BHT), 0.2% lecithin and 8.5% calcium carbonate. The production of the chewing gum base can be performed in the same way as in U.S. Pat. No. 6,986,907.

| | Formulation I (Wt %) | Formulation II (Wt %) | Formulation III (Wt %) |
|---|---|---|---|
| Chewing gum base K2 | 25.30 | 27.30 | 26.30 |
| Sorbitol | To 100 | To 100 | To 100 |
| Glycerine | 2.40 | 2.40 | 2.40 |
| Lecithin | 7.00 | 7.00 | 7.00 |
| Aspartame | 0.14 | 0.14 | 0.14 |
| Encapsulated aspartame | 0.68 | 0.68 | 0.48 |
| Menthol, spray-dried | 1.00 | 0.50 | 0.40 |
| Cherry flavoring, spray-dried | — | 1.20 | — |
| Flavoring substance-included cellulose from example 9 | 1.45 | — | 0.50 |
| Flavoring substance-included cellulose from example 10 | — | 1.15 | 0.50 |

The chewing gums of formulation (I) are formed as strips and those of formulations (II) and (III) as pellets.

Example F2

Sugar-Free Hard Caramels with Flavoring Substance-Included Cellulose According to the Invention

| Ingredient | A (Wt %) | B (Wt %) |
|---|---|---|
| Palatinite, type M | To 100% | To 100% |
| Water | 24.82% | 24.82% |
| Peppermint flavoring | 0.15% | 0.05% |
| Orange flavoring | — | 0.10% |
| Hesperetin | — | 0.01% |
| Spilanthol | — | 0.01% |
| Trans-pellitorin | 0.01% | — |
| Flavoring substance-included cellulose from example 15 | 0.75% | 0.50% |

Palatinite is mixed with water and the mixture is melted at 165° C. and then cooled to 115° C. Aroma and flavoring substance according to the invention as well as trans-pellitorin in case A and spilanthol and hesperetin in case B are added and after thorough mixing casting into moulds takes place and, following solidification, removal from the moulds and then individual packaging.

Example F3

Low-Fat Yoghurt with Flavoring Substance-Included Cellulose According to the Invention

| | Preparation (details in Wt %) | | |
|---|---|---|---|
| Ingredient | A | B | C |
| Sucrose | 10% | 8% | 6% |
| Tagatose | — | — | 0.5% |
| Fructose | — | — | 0.5% |
| Hesperetin | — | 0.01% | 0.005% |
| Phloretin | — | — | 0.005% |
| Peach flavoring | 0.30% | — | 0.40% |
| Strawberry-rhubarb flavoring | — | 0.25% | — |
| Flavoring substance-included cellulose from example 17 | 0.25% | 0.90% | 0.40% |
| Yogurt, 0.1% fat | To 100% | To 100% | To 100% |

The ingredients are mixed and cooled at 5° C.

Example F4

Dietetic Chocolate Having a Fructose Base with Flavoring Substance-Included Cellulose According to the Invention A chocolate suitable for diabetics is produced from the following ingredients and cast into rectangular tablets:
cocoa mass, fructose, skimmed milk powder, cocoa butter, inulin, clarified butter, Soya lecithin emulsifier, walnuts, table salt, yoghurt-vanilla flavoring (containing vanillin and 1 Wt % hesperetin, in relation to the total weight of the vanilla flavoring) and 1 Wt % flavoring substance-included cellulose according to the invention from example 17.
Nutritional Value (per 100 g):
protein 8.8 g, carbohydrate 34 g (of which fructose 23 g, lactose 7.5 g, sucrose 1.4 g), fat 36 g; dietary fiber 18.5 g (of which 12.2 g inulin); Sodium: 0.10 g. Chocolate content minimum 50 Wt %.

Example F5

Cereal Mixture with Flavoring Substance-Included Cellulose According to the Invention

| No. | | A (Wt %) | B (Wt %) | C (Wt %) |
|---|---|---|---|---|
| 1 | Rolled oats | 17.00 | 17.00 | 17.00 |
| 2 | Crispy oat flake clusters | 10.00 | 10.00 | 10.00 |
| 3 | Rice Krispies | 16.90 | 16.90 | 16.90 |
| 4 | Cornflakes | 16.50 | 16.50 | 16.50 |
| 5 | Currants | 3.50 | 3.50 | 3.50 |
| 6 | Hazelnuts, chopped | 2.50 | 2.50 | 2.50 |
| 7 | Glucose syrup from wheat, DE 30 | 9.50 | 9.50 | 9.50 |
| 8 | Sucrose | 19.00 | 19.00 | 19.00 |
| 9 | Water | 4.00 | 4.00 | 4.00 |
| 10 | Powdered citric acid, anhydrous | 0.10 | 0.10 | 0.10 |
| 11 | Flavoring substance-included cellulose from example 17 | 1.00 | — | 0.50 |
| 12 | Flavoring substance-included cellulose from example 20 | — | 1.00 | 0.50 |

Constituents No.'s 1 to 6 are mixed in a rotary drum (Mix 1). Constituents No.'s 7 to 9 are heated and constituents No.'s 10 to 12 are added (Mix 2). Mix 2 is added to Mix 1 and mixed well. Finally the resulting cereal mixture is placed on a baking sheet and dried in an oven at 130° C. for 8 minutes.

Example F6

Fruit Gums with Flavoring Substance-Included Cellulose According to the Invention

| Ingredients: | A (Wt %) | B (Wt %) |
|---|---|---|
| Water | 22.70 | 24.70 |
| Sucrose | 34.50 | 8.20 |
| Glucose syrup, DE 40 | 31.89 | 30.09 |
| Iso Syrup C* Tru Sweet 01750 (Cerestar GmbH) | 1.50 | 2.10 |
| Gelatin 240 Bloom | 8.20 | 9.40 |
| Polydextrose (Litesse ® Ultra, Danisco Cultor GmbH) | — | 24.40 |
| Yellow and red coloring | 0.01 | 0.01 |
| Citric acid | 0.20 | 0.10 |
| Orange flavoring | — | 0.10 |
| Flavoring substance-included cellulose from example 9 | 1.0 | 0.90 |

Example F7

Chewing Candy with Flavoring Substance-Included Cellulose According to the Invention List of Ingredients:

| | | |
|---|---|---|
| Water | | 7.7% |
| Sugar | Raffinade C4 | 41.0% |
| Glucose syrup | Dextrose 40 | 37.3% |
| Hardened vegetable fat | Melting point 32-36° C. | 6.6% |
| Lecithin | Emulsifier (Soya lecithin) | 0.3% |
| Gelatin | Pork gelatin | 0.8% |
| Fondant | Type - S30 | 4.9% |
| Flavoring substance-included cellulose from example 10 | | 1.4% |

Example F8

Fruit Muesli Bar with Flavoring Substance-Included Cellulose According to the Invention List of Ingredients:

| | | |
|---|---|---|
| Sucrose | Sugar | 17.0% |
| Dextrose 40 | Glucose syrup | 14.7% |
| Sorbit P 300 | Humectant | 5.0% |

-continued

| Vegetable fat | Melting point 37° C. | 5.0% |
| --- | --- | --- |
| Water | | 3.0% |
| Rolled oats | | 13.3% |
| Oat flakes | Oat extrudate | 10.0% |
| Cornflakes | | 5.5% |
| Rice Krispies | Rice extrudate | 20.0% |
| Currants | | 5.0% |
| Flavoring substance-included cellulose from example 17 | | 1.3% |
| Citric acid, powder | | 0.2% |

Example F9

Waffle Fatty Filling with Flavoring Substance-Included Cellulose According to the Invention List of Ingredients:

| Vegetable hard fat | Melting point 33-35° C. | 42.2% |
| --- | --- | --- |
| Sugar powder | | 37.0% |
| Dextrose | Dextrose, anhydrous, micro-fine | 19.0% |
| Citric acid | | 0.3% |
| Flavoring substance-included cellulose from example 10 | | 1.5% |

Production instructions: Bring the fat to ambient temperature of approximately 21° C. Finely sieve the sugar powder. Beat all the ingredients, including flavoring, in a Hobart laboratory mixer.

Example F10

Madeira Cake with Flavoring Substance-Included Cellulose According to the Invention List of Ingredients/Basic Recipe for Madeira Cake:

| Wheat flour | Type 405 | 15.90% |
| --- | --- | --- |
| Wheat starch | | 4.40% |
| Sucrose | Sugar, EC Grade I | 19.20% |
| Cooking salt | | 0.14% |
| Potato flour | | 6.22% |
| Egg yolk solids | | 1.84% |
| Baking powder | | 0.70% |
| Beating emulsifier | Mono-diglyceride | 1.42% |
| Water | | 18.85% |
| Pure fat | Melting point approximately 34° C. | 13.89% |
| Eggs | | 16.02% |
| Beta-carotene 1% solution | | 1.41% |
| Flavoring substance-included cellulose from example. 27 | | 0.01% |

Production Instructions:

Bring the fat to temperature. Place all dry matter, including the encapsulation product according to the invention, in the mixing bowl of the Hobart laboratory mixer. Then add the pure fat, water and eggs and beat for 1 minute at level 1 and 2 minutes at level 3. Place the dough in a baking tin and bake for 55 minutes at 180° C.

Example F11

Short Pastry Biscuits (Industrial Quality) with Flavoring Substance-Included Cellulose According to the Invention List of Ingredients:

| Wheat flour | Type 550 | 53.49% |
| --- | --- | --- |
| Soft vegetable fat | Melting point 24/26° C. | 19.0% |
| Sugar powder | | 19.0% |
| Salt | | 0.4% |
| Ammonium bicarbonate | Leavening | 0.4% |
| Skimmed milk powder | | 1.0% |
| Maltose syrup | DE 60.5 | 1.2% |
| Water | | 5.50% |
| Flavoring substance-included cellulose from example 28 | | 0.005% |

Production Instructions:
a) Allow the sugar powder, maltose syrup, skimmed milk powder and soft vegetable fat to run smooth in the Hobart laboratory kneader at level 1.
b) Using some of the water to dissolve the ammonium bicarbonate and add the remaining water to the mixture from a) and mix briefly.
c) Add the remaining ingredients with the flavoring substance-included cellulose from example 28 to mixture a) and work into a smooth dough.
d) Roll out the dough with the rolling machine to a thickness of approximately 3 mm, mark out a sample possibly using a wooden cutter, and cut out in the desired shape.

Final thickness of the dough: approximately 2.6 mm; oven temperature: 200° C., baking time: 6 minutes.

Example F12

Snack Item with Flavoring Substance-Included Cellulose According to the Invention Example Recipe for the Production of Crackers:
wheat flour (60-63%), baking powder (1.0-1.5%), vegetable fat (6.0-6.5%), maltose syrup (2.0-2.5%), emulsifier (1.2-1.8%), ammonium bicarbonate (1.5-2.0%), spray-process skimmed milk powder (1.0-1.5%), fresh baker's yeast (0.3-0.9%), table salt (0.3-0.6%), water (20.0-23.5%), flavoring substance according to the invention (approximately 0.01 Wt %), here preferably a flavoring substance-included cellulose according to example 18.

The crackers are baked or deep-fried following the mixing of the ingredients.

Example F13

Seasoning with Flavoring Substance-Included Cellulose According to the Invention Example Recipe for the Production of Seasonings, E.g. for Snack Items:
table salt (10-25%), carrier (e.g. whey powder) (40-60%), filler (e.g. fat powder) (5-15%), flavor enhancer (1.5-3.5%), adjuvant (e.g. silicic acid) (0, 1-5%), cheese powder (10-30%), hydrolyzed vegetable proteins (5-10%), yeast extract (5-15%), spices (1-5%), acidifier (e.g. citric acid) (0.1-1.0%), coloring (e.g. paprika extract) (0.1-1.0%), flavoring substance according to the invention from example 29 (0.05-0.5 Wt %).

Example F14

Cream of Leek Soup with Flavoring Substance-Included Cellulose According to the Invention A cream of leek soup is produced according to the following formulation: milk fat element, Vana Crema (25-30%), potato starch (15-25%), milk sugar, lactose (18-22%), maltodextrin (10-12%), salt (7-9%), monosodium glutamate (2-4%), vegetable fat (2-4%), spinach powder (1-2%), citric acid powder (0.2-0.4%), leek powder (1-2%), freeze-dried leek particles (approximately 10×10 mm) (0.5-1.5%), vegetable stock powder (0.2-0.5%), curcuma extract (0.05-0.1%), encapsulation product according to the invention from example 30 (0.01-0.1 Wt %).

Example F15

Blend of Spices for Crisps with Flavoring Substance-Included Cellulose According to the Invention

| Ingredient | Formulation A |
| --- | --- |
| Monosodium glutamate | 3.50 g |
| Cheese powder | 10.00 g |
| Garlic powder | 2.00 g |
| Whey powder | 38.86 g |
| Spice extract oil | 0.20 g |
| Paprika powder | 9.80 g |
| Cooking salt | 19.00 g |
| Tomato powder | 9.00 g |
| Dry flavoring | 2.50 g |
| Silicon dioxide | 0.02 g |
| Vegetable oil | 0.02 g |
| Onion powder | 3.00 g |
| Cheese flavoring | 0.03 g |
| Concentrated tomato flavoring | 0.04 g |
| Flavoring substance-included cellulose according to example 32 | 2.00 g |

6 g of the blend of spices are spread over 94 g of crisps.

Example F16

White Sauce with Flavoring Substance-Included Cellulose According to the Invention

| Ingredient | Formulation |
| --- | --- |
| Maltodextrin | 28.42 g |
| Cooking salt | 5.35 g |
| Monosodium glutamate | 2.00 g |
| Vegetable fat | 5.00 g |
| White pepper | 0.02 g |
| Onion powder | 1.50 g |
| Pre-gelatinized corn starch | 30.00 g |
| Fat powder | 27.70 g |
| Flavoring substance-included cellulose according to example 29 | 0.01 g |

Hot water is poured onto 90 g of the sauce mixture and vigorously stirred with the whisk.

Example F17

Brown Sauce with Flavoring Substance-Included Cellulose According to the Invention

| Ingredient | Formulation |
| --- | --- |
| Starch | 39.00 g |
| Maltodextrin | 34.09 g |
| Cooking salt | 6.00 g |
| Spirit caramel, spray-dried | 5.00 g |
| Yeast extract powder | 3.00 g |
| Monosodium glutamate | 2.00 g |
| Sugar | 0.50 g |
| Fat powder | 5.00 g |
| Tomato powder | 3.00 g |
| Natural vegetable extract | 1.00 g |
| Onion extract | 0.30 g |
| Pepper extract | 0.10 g |
| Dry flavor | 1.00 g |
| Flavoring substance-included cellulose according to example 29 | 0.01 g |

1,000 ml of hot water are poured onto 90 g of the sauce mixture and vigorously stirred with the whisk.

Example F18

Tomato Soup with Flavoring Substance-Included Cellulose According to the Invention

| Ingredient | Formulation |
| --- | --- |
| Water | 50.70 g |
| Vegetable oil | 5.50 g |
| Tomato paste | 24.00 g |
| Cream | 1.00 g |
| Sugar | 2.00 g |
| Cooking salt | 1.70 g |
| Monosodium glutamate | 0.40 g |
| Wheat flour | 5.50 g |
| Starch | 1.20 g |
| Diced tomatoes | 7.50 g |
| Flavoring substance-included cellulose according to example 31 | 0.5 g |

The solid ingredients are weighed, mixed and added to the water. The vegetable oil is dosed in and the tomato paste added. The mixture is boiled whilst stirring.

Example F19

Instant Soup with Flavoring Substance-Included Cellulose According to the Invention, Type: Cream of Leek

| Ingredient | Weight |
| --- | --- |
| Potato starch | 20.0 g |
| Fat powder | To 100 g |
| Lactose | 20.0 g |
| Maltodextrin | 11.73 g |
| Cooking salt | 8.0 g |
| Monosodium glutamate | 3.0 g |

-continued

| Ingredient | Weight |
| --- | --- |
| Spinach powder | 2.0 g |
| Green leek powder | 2.0 g |
| Citric acid, in powder form | 0.3 g |
| Hardened vegetable fat | 3.0 g |
| Freeze-dried leek | 1.0 g |
| Chicken flavoring | 1.0 g |
| Spice blend, "fried onions" type | 0.6 g |
| Yeast-spice mixture, "vegetable stock" type, powder | 0.3 g |
| Curcuma extract | 0.07 g |
| Flavoring substance-included cellulose according to example 30 | 0.1 g |

100 ml of hot water are poured onto 5 g of the powder mixture, in order to obtain a ready-to-eat soup.

Example F20

Spice Blend with Flavoring Substance-Included Cellulose According to the Invention, "Pepper" Type"

| Ingredient | Formulation |
| --- | --- |
| Milk protein | 0.8 g |
| Carob gum | 2.0 g |
| Corn starch | To 100 g |
| Cooking salt | 14.0 g |
| Paprika powder | 12.0 g |
| Tomato powder | 12.0 g |
| Sucrose | 4.0 g |
| Garlic powder | 0.5 g |
| Hardened vegetable fat | 8.0 g |
| Fat powder | 10.0 g |
| Monosodium glutamate | 6.0 g |
| Food coloring beetroot and paprika | 2.0 g |
| Flavoring, "pepper" type | 2.0 g |
| Flavoring, "pizza" type | 1.2 g |
| Flavoring substance-included cellulose according to example 31 | 0.4 g |
| Extract of black pepper | 0.1 g |

100 g of pork chops are evenly sprinkled with 1.7 g of the preparation and fried.

Example F21

Stock with Flavoring Substance-Included Cellulose According to the Invention

| Ingredient | Weight |
| --- | --- |
| Fat powder | 8.77 g |
| Monosodium glutamate | 8.77 g |
| Yeats extract powder | 12.28 g |
| Cooking salt | 29.83 g |
| Maltodextrin | To 100 g |
| Natural vegetable extract | 3.07 g |
| Flavoring substance-included cellulose according to example 29 | 0.01 g |
| Flavoring substance-included cellulose according to example 31 | 0.5 g |

1,000 ml of hot water are poured over 15 g of the powder mixture and possibly boiled for up to 30 minutes, wherein additional noodles can be added.

Example F22

Tomato Ketchup with Flavoring Substance-Included Cellulose According to the Invention

| Ingredient | (Wt %) |
| --- | --- |
| Cooking salt | 2 |
| Starch, Farinex WM 55 | 1 |
| Sucrose | 12 |
| Hesperetin 2.5% in 1,2-propylene glycol | 0.4 |
| Tomato concentrate, double strength | 40 |
| Glucose syrup 80 Brix | 18 |
| Brandy vinegar 10% | 7 |
| Water | To 100 |
| Flavoring substance-included cellulose according to example 31 | 0.5 |

The contents are mixed in the specified order and the finished ketchup is homogenized using a stirrer, filled in bottles and sterilized.

Specific Embodiments

Specific embodiment one comprises a flavoring substance-included cellulose, comprising or consisting of
(i) cellulose and
(ii) one, two, three, four or more flavoring substances included in the cellulose, providing that the flavoring substances are not alkanoic acids with between 1 and 4 C-atoms.

Specific embodiment two comprises a flavoring substance-included cellulose according to specific embodiment one, wherein the or one, several or all of the included flavoring substances has (have) a $logP_{OW}$ of greater than 1.0, preferably greater than 1.5, preferably greater than 2.0, more preferably greater than 3.0 and particularly preferably greater than 4.0.

Specific embodiment three comprises a flavoring substance-included cellulose according to specific embodiment one or two, comprising or consisting of
(i) 75 to 99 Wt %, preferably 75 to 95 Wt % cellulose and
(ii) a total of 1 to 25 wt %, preferably 5 to 25 Wt % included flavoring substances, provided that flavoring substances are not alkanoic acids with between 1 and 4 C-atoms.

Specific embodiment four comprises a flavoring substance-included cellulose according to one of the above specific embodiments, wherein the cellulose (i) has a degree of polymerization in the range 1,000 to 12,000, preferably in the range 1,500 to 8,000.

Specific embodiment five comprises a flavoring substance-included cellulose according to one of the above specific embodiments, wherein the cellulose (i) has a degree of substitution of less than 0.5, preferably of less than 0.1, particularly preferably of less than 0.015.

Specific embodiment six comprises a flavoring substance-included cellulose according to one of the above specific embodiments, wherein the cellulose (i) has a fiber length of 0.1 to 5000 μm, preferably of 1.0 to 500 μm, particularly preferably of 5.0 to 150 μm.

Specific embodiment seven comprises a flavoring substance-included cellulose according to one of the above specific embodiments, wherein the cellulose (i) has a fiber thickness of 0.5 to 80 μm, preferably of 1.0 to 50 μm, particularly preferably of 1.0 to 30 μm.

Specific embodiment eight comprises a mixture comprising or consisting of
(i+ii) flavoring substance-included cellulose according to one of the above specific embodiments and
(iii) accompanying substances
and/or
(iv) water.

Specific embodiment nine comprises a mixture according to specific embodiment eight, comprising or consisting of
(i+ii) 70 to 99.8 Wt % of flavoring substance-included cellulose according to one of specific embodiments one to seven and
(iii) a total of 0.1 to 30 Wt %, preferably 15 to 30 Wt % of accompanying substances
and/or
(iv) 0.1 to 15 Wt %, preferably 1 to 10 Wt % water,
in each case in relation to the total weight of the mixture.

Specific embodiment ten comprises a mixture according to specific embodiments eight or nine, wherein the accompanying substances (iii) are selected from the group comprising hemicellulose and lignin, wherein
the total quantity of hemicellulose in relation to the total weight of the accompanying substances (iii) is in the range 70 to 100 Wt %, preferably in the range 88 to 99.9 Wt % and/or the total quantity of lignin in relation to the total weight of the accompanying substances (iii) is in the range 0 to 30 Wt %, preferably in the range 0.1 to 12 Wt %.

Specific embodiment eleven comprises a method for producing a flavoring substance-included cellulose, comprising the following steps:
(I) inclusion of one or more primary swelling agent(s) (A) in cellulose;
(III) partial or complete replacement of included swelling agents by one, two, three, four or more flavoring substances, providing that the flavoring substances are not alkanoic acids with between 1 and 4 C-atoms,
so that the flavoring substances are included in the cellulose.

Specific embodiment twelve comprises a method for producing a flavoring substance-included cellulose according to specific embodiment eleven, wherein swelling agent included in step (III) is only partially replaced, also comprising the following step:
(IV) removal of included swelling agents not replaced by flavoring substances.

Specific embodiment thirteen comprises a method for producing a flavoring substance-included cellulose according to specific embodiment eleven or twelve, also comprising the following step:
(II) partial or complete replacement of included primary swelling agents (A) by one or more secondary swelling agents (B), so that these are included in the cellulose,
and then optionally the step:
(IIb) partial or complete replacement of secondary swelling agents (B) included in cellulose by one or more further secondary swelling agent(s) (B)
and repetition of this step as necessary.

Specific embodiment fourteen comprises a method for producing a flavoring substance-included cellulose according to one of specific embodiments eleven to thirteen wherein the or one, several or all of the primary swelling agent(s) (A) is (are) selected from the group (a1) comprising water, glycerine, propylene glycol, formic acid, ammonia, aqueous solutions of metal hydroxides, in particular sodium hydroxide and potassium hydroxide, and mixtures thereof; preferably from the group comprising water, aqueous solutions of sodium hydroxide and aqueous solutions of potassium hydroxide,
or
the group (a2) comprising acetic acid.

Specific embodiment fifteen comprises a method for producing a flavoring substance-included cellulose according to specific embodiment fourteen, wherein
the method comprises a step (II) as defined in specific embodiment thirteen and the or one, several or all the primary swelling agent(s) (A) to be replaced is (are) selected from the group (a1) comprising water, glycerine, propylene glycol, formic acid, ammonia, aqueous solutions of metal hydroxides, in particular sodium hydroxide and potassium hydroxide, and mixtures thereof; preferably from the group comprising water, aqueous solutions of sodium hydroxide and aqueous solutions of potassium hydroxide;
or
the method does not comprise a step (II) as defined in specific embodiment thirteen and the or one of the primary swelling agent(s) (A) is selected from the group (a2) comprising acetic acid.

Specific embodiment sixteen comprises a method for producing a flavoring substance-included cellulose according to one of specific embodiments thirteen to fifteen, wherein the or one, several, more or all of the secondary swelling agent(s) (B) is (are) selected from the group comprising ethanol, propanol, butanol, butyric acid, propionic acid and mixtures thereof; preferably from the group comprising ethanol and propanol.

Specific embodiment seventeen comprises a method for producing a flavoring substance-included cellulose according to one of specific embodiments eleven to sixteen, wherein the or one, several or all of the primary swelling agent(s) (A) and/or the secondary swelling agent(s) (B) has (have) a higher vapor pressure than the, or one, several or all of the flavoring substance(s) used in step (III).

Specific embodiment eighteen comprises a method for producing a flavoring substance-included cellulose according to one of specific embodiments eleven to eighteen, wherein in step (I) the cellulose is present in a mixture with hemicellulose and/or lignin,
wherein
the proportion of hemicellulose in relation to the total weight of cellulose, hemicellulose and lignin is 0.001 to 80 Wt %, preferably 5 to 50 Wt %, and particularly preferably 15 to 40 Wt %,
and/or
the proportion of lignin in relation to the total weight of cellulose, hemicellulose and lignin is 0.01 to 10 Wt %, preferably 0.1 to 8 Wt % and particularly preferably 1 to 7 Wt %.

Specific embodiment nineteen comprises a method for producing a flavoring substance-included cellulose according to one of specific embodiments eleven to eighteen, wherein in step (I) prior to inclusion of the swelling agent the proportion of primary swelling agents (A) in a starting mixture ($M_I$) comprising cellulose, primary swelling agent (A) and possibly hemicellulose and/or lignin is at least 20 Wt %, preferably at least 30 Wt %, preferably at least 40 Wt %, in relation to the total weight of cellulose, primary swelling agent (A), hemicellulose and lignin in the starting mixture ($M_I$).

Specific embodiment twenty comprises a method for producing a flavoring substance-included cellulose according to one of specific embodiments eleven to nineteen, wherein in step (I) prior to inclusion of the swelling agent the proportion of primary swelling agents (A) in a starting mixture ($M_I$)

comprising cellulose, primary swelling agent (A) and possibly hemicellulose and/or lignin is in the range 20 to 95 Wt %, preferably in the range 30 to 90 Wt %, particularly preferably in the range 40 to 80 Wt %, in relation to the total weight of cellulose, primary swelling agent (A), hemicellulose and lignin in the starting mixture ($M_I$).

Specific embodiment twenty-one comprises a method for producing a flavoring substance-included cellulose according to one of specific embodiments eleven to twenty, wherein swelling agent to be replaced in step (III) is a component of a starting mixture ($M_{III}$), containing cellulose, included and possibly non-included swelling agent and possibly hemicellulose and/or lignin, wherein the total proportion of included and non-included swelling agent is in the range 5 to 90 Wt %, preferably in the range 10 to 70 Wt %, particularly preferably in the range 20 to 50 Wt %, in relation to the total weight of cellulose, included and not included swelling agent, hemicellulose and lignin in the starting mixture ($M_{III}$).

Specific embodiment twenty-two comprises a flavoring substance-included cellulose according to one of specific embodiments one to seven or mixture according to one of specific embodiments eight to ten, wherein the flavoring substance-included cellulose or the mixture can be produced by a method according to one of specific embodiments eleven to twenty-one.

Specific embodiment twenty-three comprises a mixture according to one of specific embodiments eight to ten or according to specific embodiment twenty-two, comprising or consisting of
(i+ii) flavoring substance-included cellulose according to one of specific embodiments one to seven and
(iii) possibly accompanying substances,
(iv) possibly water and
(v) flavoring substances not included in cellulose.

Specific embodiment twenty-four comprises a mixture according to specific embodiment twenty-three, wherein
the proportion of (i+ii) flavoring substance-included cellulose, (iii) any accompanying substances present and (iv) any water present is 50 to 99.9 Wt %, preferably 75 to 99.9 Wt % and
the proportion of the (v) flavoring substances not included in cellulose is 0.1 to 50 Wt %, preferably 0.1 to 25 Wt %,
in each case in relation to the total weight of the mixture.

Specific embodiment twenty-five comprises use of a flavoring substance-included cellulose according to one of specific embodiments one to seven or according to specific embodiment twenty-two or of a mixture according to one of specific embodiments eight to ten or one of specific embodiments twenty-two to twenty-four for flavoring a preparation or semi-finished product for nourishment or pleasure.

Specific embodiment twenty-six comprises the preparation or semi-finished product for nourishment or pleasure, comprising a quantity of flavoring substance-included cellulose according to one of specific embodiments one to seven or according to specific embodiment twenty-two or a mixture according to one of specific embodiments eight to ten or according to one of specific embodiments twenty-two to twenty-four.

Specific embodiment twenty-seven comprises the preparation or semi-finished product for nourishment or pleasure according to specific embodiment twenty-six, wherein the total quantity of flavoring substance-included cellulose in relation to the total weight of the preparation or semi-finished product is in the range 0.001 to 10 Wt %, preferably in the range 0.25 to 5 Wt %, particularly preferably in the range 0.5 to 3 Wt %.

The invention claimed is:

1. A flavoring composition comprising:
(i) cellulose; and
(ii) one or more flavoring substances having a $logP_{ow}$ of greater than 1.0 embedded into voids of the cellulose at a molecular level,
(iii) an accompanying substance selected from the group consisting of hemicellulose, lignin, and mixtures thereof,
   wherein the total quantity of hemicellulose in relation to the total weight of the accompanying substance (iii) is in the range of 70 to 100 wt.%, and
   the total quantity of lignin in relation to the total weight of the accompanying substance (iii) is in the range of 0 to 30 wt.%; and
(iv) optionally water;
   wherein the cellulose (i) has a degree of substitution of less than 0.5, and
   wherein the flavoring substances are embedded into voids of the cellulose at a molecular level by a process comprising:
(A) swelling the cellulose with a primary swelling agent selected from the group consisting of water, glycerin, propylene glycol, formic acid, ammonia, an aqueous solution of a metal hydroxide, and mixtures thereof;
(B) replacing at least a portion of the primary swelling agent with a secondary swelling agent selected from the group consisting of ethanol, propanol, butanol, butyric acid, propionic acid, and mixtures thereof;
(C) replacing at least a portion of the secondary swelling agent with the one or more flavoring substances having a $logP_{ow}$ of greater than 1.0; and
(D) removing at least a portion of the secondary swelling agent.

2. The flavoring composition according to claim 1, wherein one or more of the embedded flavoring substances have a $logP_{ow}$ of greater than 1.5.

3. The flavoring composition according to claim 1, wherein one or more of the embedded flavoring substances has a $logP_{ow}$ of greater than 2.0.

4. The flavoring composition according to claim 1, wherein one or more of the embedded flavoring substances has a $logP_{ow}$ of greater than 3.0.

5. The flavoring composition according to claim 1, wherein the cellulose has a degree of substitution of less than 0.1.

6. The flavoring composition according to claim 1, comprising
(i) 75 to 99 wt.% of the cellulose, and
(ii) 1 to 25 wt.% of the one or more flavoring substances.

7. The flavoring composition according to claim 1, wherein the cellulose (i) has a degree of polymerization in the range 1,000 to 12,000.

8. The flavoring composition according to claim 4, wherein the cellulose has a degree of polymerization in the range 1,500 to 8,000.

9. The flavoring composition according to claim 1, wherein the cellulose (i) has a fiber length of 0.1 to 5000 µm.

10. The flavoring composition according to claim 6, wherein the cellulose has a fiber length of 1.0 to 500 µm.

11. The flavoring composition according to claim 6, wherein the cellulose has a fiber length of 5.0 to 150 µm.

12. The flavoring composition according to claim 1, wherein the cellulose (i) has a fiber thickness of 0.5 to 80 µm.

13. The flavoring composition according to claim 1, wherein the cellulose has a fiber thickness of 1.0 to 50 µm.

14. The flavoring composition according to claim 1, wherein the cellulose has a fiber thickness of 1.0 to 30 µm.

15. The flavoring composition of claim 1, comprising
(i+ii) 70 to 99.8 wt.% of the cellulose and the one or more flavoring substances, and
(iii) 0.1 to 30 wt.% of the accompanying substances, and
(iv) 0.1 to 15 wt.% of the water.

16. The flavoring composition of claim 1 further comprising:
(v) flavoring substances not embedded in cellulose.

17. The flavoring composition of claim 1, wherein the primary swelling agent (A) is selected from the group consisting of water, aqueous solutions of sodium hydroxide and aqueous solutions of potassium hydroxide.

18. A preparation or semi-finished product for nourishment or pleasure comprising a quantity of the flavoring composition according to claim 1.

19. The preparation or semi-finished product of claim 18, wherein the total quantity of the flavoring composition in relation to the total weight of the preparation or semi-finished product is in the range of 0.001 wt.% to 10 wt.%.

20. A method for flavoring a preparation or semi-finished product for nourishment or pleasure comprising adding the flavoring composition according to claim 1 to the preparation or the semi-finished product.

\* \* \* \* \*